United States Patent Office 3,632,563
Patented Jan. 4, 1972

3,632,563
ESSENTIALLY CIS RUBBERY POLYISOPRENE AND METHOD FOR MAKING SAME
Lynn B. Wakefield, Akron, Ohio, and Frederick C. Foster, Verona, N.J., assignors to The Firestone Tire & Rubber Company, Akron, Ohio
No Drawing. Continuation-in-part of applications Ser. No. 530,396, Aug. 24, 1955, and Ser. No. 605,438, Aug. 21, 1956. This application June 4, 1962, Ser. No. 199,603
Int. Cl. C08d 1/20, 3/10
U.S. Cl. 260—94.2   19 Claims

ABSTRACT OF THE DISCLOSURE

Essentially cis rubbery polyisoprene is produced by polymerizing isoprene in the presence of lithium-containing or Ziegler catalysts.

---

This application is a continuation-in-part of the co-pending Wakefield and Foster applications Ser. No. 530,396, filed Aug. 24, 1955, now abandoned, and Ser. No. 605,438, filed Aug. 21, 1956, now abandoned.

This invention relates to elastomeric synthetic polymers and, more particularly, to polymeric elastomers combining the desirable physical and chemical properties of both natural rubber and the presently employed synthetic rubbers. The invention further relates to a method for making such synthetic polymers.

It has been known for some time that natural rubber is a composition essentially composed of hypothetical "isoprene" units and minor but significant amounts of other substances derived from the rubber tree during the biochemical synthsis process. These substances include proteins, soaps, resins and sugars which cannot completely be removed without adverse effect on the natural polymer. As a result, even the most refined natural rubbers available are not pure hydrocarbons. Consequently, in the processing and curing of natural rubber, oxidation reactions take place forming carbonyl groups or other oxygen-containing structures. It has been clearly established that the material or materials in natural rubber other than the natural polymer have a definite effect upon the physical and chemical characteristics of the over-all composition.

Despite the proven structure of natural rubber, it is now accepted that the natural polymer is not formed by the polymerization of isoprene. Instead, β-methylcrotonic acid, biosynthesized from acetic acid via acetoacetic acid, is actually the precursor of the natural elastomer. The β-methylcrotonic acid (as a salt) is polymerized and is reduced by the action of acetoacetic enzymes and reducing enzymes (redases). The action of acetoacetic enzyme in the Hevea braziliensis and the guayule plant is specific and produces a substantially all-cis-polymer.

Recently developed methods for determining the structure of organic compounds and compositions have established that natural rubber possesses essentially a 1,4-structure, that is, the "isoprene" units of the rubber molecules are connected to each other through a 1,4-addition to produce a linear chain. Since each isoprene unit in the chain contains an unsymmetrical ethylene group, both the cis and trans isomers are possible. It has been determined that Hevea rubber rolecules are essentially cis in structure, whereas Balata molecules are essentially trans in structure. As a consequence, Hevea rubber is very "rubbery," whereas Balata is quite resinous in its properties. Infra-red analysis of Hevea rubber has shown that the polymer consists of about 97.8% cis-1,4-structure and about 2.2% 3,4-structure. Balata consists of about 98.7% trans structure and about 1.3% 3,4-structure. Total unsaturation of Hevea rubber has been to be about 95%.

Synthetic polyisoprenes heretofore known to the art have contained about 60 to 65% or more of trans 1,4-structure. The butadiene portions of a typical GR-S emulsion polymer contains about 64% trans 1,4-structure, 18% cis 1,4-structure and 18% 1,2-structure.

Hevea natural rubber is characterized by excellent tack, especially after milling, thus being ideal for tire building operations. Hevea produces vulcanizates having excellent resilience and low hysteresis properties, high tensile strength, and good flexibility at low temperatures. Gum vulcanizates formed from Hevea also possess high tensile strength. At room temperatures Hevea natural rubber is also characterized by a crystallinity of at least about 40% and displays a crystalline X-ray diffraction pattern at 200% elongation at room temperature.

Heretofore, the syntheic rubbers, in comparison with Hevea rubber, have exhibited low tack and no crystalline properties while their vulcanizates have been characterized by undesirably low tensile strengths and resilience, and undesirably high hysteresis. The synthetic rubbers, particularly the butadiene/styrene copolymer (GR-S), have been greatly superior to natural rubber in resisting crack initiation in service but have been markedly inferior to Hevea in resisting crack and cut growth. The undesirably high hysteresis of the synthetic rubber polymers has prevented their use in any substantial quantity in the production of such articles as the large tires employed on trucks, buses, and large off-the-road vehicles.

Despite long and continued efforts on the part of the prior art, no synthetic rubber has heretofore been produced possessing the above enumerated characteristics of natural rubber which are essential in many industrial applications. Although the GR-S-type rubbers are extensively used in such applications as passenger car tires, their shortcomings even there have been generally recognized. Even the gigantic Government-sponsored synthetic rubber program has been unsuccessful in producing synthetic elastomers having properties even approaching those of natural rubber.

Moreover, despite the discovery nearly a hundred years ago that natural rubber has the structure of a polyisoprene, all attempts to duplicate the natural product by the polymerization of isoprene have been unsuccessful. None of the synthetically produced rubbery products has possessed properties equivalent to those of natural rubber. As pointed out by Richardson and Sacher in "Rubber Chemistry and Technology," 27, No. 2, pp. 348-362 (1954) polyisoprenes prepared by known methods have never contained more than about 40% of cis-1,4-structure. Furthermore, the polymerization processes have been extremely slow, even from the standpoint of laboratory experimentation. In fact, the only synthetic rubbers having any substantial utility prior to the development of GR-S rubber where the Buna rubbers (e.g. polybutadiene-1,3) and neoprene (polychloroprene).

During the past twenty-five years considerable experimental work has been done in sodium catalyzed polymerizations. Both the Germans and Russians have produced sodium catalyzed polybutadiene rubbers which have enjoyed limited use but which have never been competitive with either natural rubber or the emulsion polymerized butadiene/styrene copolymers. Prior polybutadiene polymers, inclusive of the sodium polymerized materials, have never even approached the physical properties of natural rubber. Very little work is reported on the use of lithium catalysis in this field, partly because lithium has not been readily available in the past and also because polymerizations attempted in the presence of lithium as a catalyst have appeared to progress at a much slower rate than sodium-catalyzed polymerizations. Moreover, the published work in this field which specifically mentions lithium catalysis teaches that the polymer products so made are at least comparable to and in some instances identical to polymer products produced with other alkali metal catalysts, including sodium.

A primary object of the present invention, therefore, is a synthetic polymer which will substantially duplicate the desired characteristics of natural Hevea rubber and, at the same time, possess the desirable attributes of the best synthetic rubbers presently available.

A further object of the invention is to provide a process for producing such a synthetic polymer.

An additional object of the present invention is a synthetic polymer, which, when compounded into tire stock, inherently possesses the tack requisite to tire building operations and thus does not require use of cement.

A further object of the present invention is a synthetic polymer which will combine low heat build up and high strength at elevated temperatures.

Another object of the present invention is a synthetic polymer which, when compounded into a rubber stock, will at the same time exhibit enhanced crack resistance, crack growth resistance and cut growth resistance.

A specific object of the invention is a polymeric isoprene which is substantially equivalent in physical properties to natural rubber and which also possesses the desired attributes of the known synthetic rubbers.

Another specific object of the invention is to provide a process for making such a polymeric isoprene by polymerizing isoprene in the presence of a catalyst comprising lithium as its essential active ingredient.

The polyisoprene synthetic rubbers of the invention contain at least about 80% cis-1,4-structure, not in excess of 10% trans 1,4-structure, no more than about 10% 3,4-structure and essentially no 1,2-structure. One group of commercially satisfactory polymers contain from about 80 to about 96% cis-1,4-structure, from 0 to about 10% trans 1,4-structure, from about 3 to about 10% 3,4-structure and essentially no 1,2-structure. As distinguished from all prior art synthetic hydrocarbon rubbers, vulcanizable by sulfur, the synthetic polyisoprenes of the invention are crystalline although not nearly as crystalline as natural rubber. By dilatometric measurement,[1] it has been determined that natural rubber exhibits a greater volume decrease than the synthetic polymers of the invention, thus establishing the greater crystallinity of the natural product. For example, at a temperature of $-40°$ C., pale crepe exhibits a volumetric decrease of .026 cc./g. in 300 hrs., while the volumetric decrease of the synthetic polymers of the invention has generally ranged between .002 and .006 cc./g. with a maximum decrease of .0196 cc./g. being obtained in the case of the most crystalline synthetic polymer produced.

X-ray diffraction patterns of the silver nitrate complexes of Hevea and the synthetic polymers of the invention also establish this difference in crystallinity.[2] In this technique of analysis, polymer solutions are reacted with silver nitrate and the resulting complex is precipitated with methanol. Pressed plaques of the precipitate are then submitted to X-ray diffraction. Since the polymers are unoriented, their crystallinity is established by the presence of Debye-Scherrer rings. The percent crystallinity of the particular sample is determined by examination of the clearness and intensity of the rings. By this technique, it was determined that Hevea is about 20% more crystalline than any synthetic polyisoprene produced in accordance with the invention.

These determinations of comparative crystallinity are fully supported by the fact that at room temperature, an oriented crystalline X-ray diffraction pattern may be obtained with Hevea at 200% elongation while such a pattern is not obtained with the synthetic polyisoprene of the invention at room temperature at less than about 400% elongation.

Compounded compositions containing the polymers of the invention possess better green strength than either natural rubber or any of the known synthetic rubbers. When vulcanized, the polymers of the invention are equivalent to natural rubber in gum strength, but are characterized by lower tensile strength and modulus, although both tensile and modulus are much higher than in GR-S rubber. Vulcanizates formed from the synthetic polymers of the invention are markedly superior in crack resistance to natural rubber vulcanizates and equivalent to natural rubber vulcanizates in crack and cut growth resistance. Moreover, tread stocks of the synthetic polyisoprene are distinctly more resistant to crown break than similar stocks formed from natural rubber or GR-S. Elongation values for the synthetic polyisoprene stocks are considerably higher than for natural rubber stocks.

Of paramount importance is the fact that the hysteresis characteristics of the polyisoprenes of the invention are at least equivalent and in some cases even better than those of natural rubber. In particular, gum rubber vulcanizates prepared from the synthetic polymer are consistently characterized by better hysteresis properties than are the natural gum vulcanizates.

The synthetic polyisoprenes of the invention are pure hydrocarbons and are completely free from the impurities present in Hevea. Thus, problems presented during curing of Hevea compounds traceable to these extraneous materials are absent in like processing of the synthetic polymers. As will be illustrated, preferred isoprene polymers in accordance with the invention are substantially free from gel and thus do not require the degree of milling requisite to obtaining desired viscosity. Further, by variation of reaction conditions, the polymers of the invention may be prepared in a wide range of molecular weights, while still maintaining the desired high cis-1,4-content.

Since the synthetic polymers of the invention closely resemble Hevea, they may be treated, mixed or compounded by conventional natural rubber techniques. However, due to the fact that the synthetic material is not as complex but more pure and uniform, greater precision and control may be exercised in formulation, compounding and manufacturing techniques than has been possible with the natural product.

The polyisoprene of the invention is readily plasticized by milling, so that it is similar in this respect to Hevea rubber. The plasticized polyisoprene is readily calendered in accordance with regular factory procedure. Milled or calendered polyisoprene of the invention possesses very good tack. In contrast to the various GR-S synthetic rubbers, no cement need be employed in building a tire or other laminated product from rubber compositions containing substantial proportions of the polyisoprene of the invention.

Compounding and curing of the synthetic polymers of the invention are effected according to usual practices employed with Hevea rubber. For example, cures of the polymers of the invention are brought about by conventional rubber curing techniques. Free sulfur as a curing agent is ordinarily employed in conjunction with an accelerator or combinations of accelerators. As in the case of Hevea rubber, it is generally desirable to employ free sulfur in an amount of from about 0.1 to about 10 percent based on the weight of the polymer where a soft rubber compound is to be produced. For hard rubber compounds from about 25 to about 50 percent free sulfur based on the polymer is used. Curing agents other than free sulfur suitable for curing Hevea rubber are also suitable for curing the synthetic polymers of the invention. Such other curing agents include selenium and tellurium (which may be used in conjunction with or replacing sulfur) dicumyl peroxide, the various phenol polysulfides including the alkyl derivatives thereof, the xanthogen poly-

---

[1] This technique is described in Lucas et al., Dilatometric Measurement of Molecular Regularity in Polymers, Ind. Eng. Chem., 41, p. 1629, August 1949.

[2] This general technique is described in G. Soloman & C. Koningsberger, J. Pol. Sci. 2, 522, 534 (1947).

sulfides, the thiuram disulfides and polysulfides, various amine sulfides including dialkyl amine polysulfides and reaction products of primary amines with excess sulfur. Certain extremely finely divided colloidal sulfur preparations are sometimes advantageous. Other curing agents which may be utilized include the well known nitroso compounds, oximes, nitro compounds, azo compounds, and other materials which often act as oxidizing agents. Further, the polymers of the invention are vulcanized by treatment with X-rays, cosmic rays, electron beams, ultra high-frequency electromagnetic waves and ultrasonic vibration. These vulcanizing means can be combined with any of the curing agents mentioned above. The compound or stock can be heated in any known manner, including electronic heating, infrared heating, as well as the more conventional steam, hot water and oven heating methods. Ordinarily, vulcanization is effected by heating the compound at temperatures in the range of from 70° C. to 220° C. Since the temperature coefficient of vulcanization is in the range of 2.0 to 3.0 per 10° C., it is obvious that higher or lower vulcanization temperatures may be employed.

Along with the curing agent, as in the case of Hevea rubber, the usual accelerators, accelerator activators, retarders and the like are employed as desired. Such accelerators include the large classes of thiazole sulfenamides, thiazoline sulfenamides, thiocarbamyl sulfenamides, mercapto thiazoles, mercapto thiazolines, thiazolyl disulfides, the dithiocarbamates, the thiuram sulfides, guanidines, the xanthogen sulfides, metallic salts of mercapto thiazoles or mercapto thiazolines or dithiocarbamic acids, aldehyde amines, lead oxides and salts. Commercial accelerators of value in vulcanizing the polymers of the invention include 2-mercaptobenzothiazole, 2-mercaptothiazole, 2,2'-dithiobisbenzothiazole, di-ortho-tolyl guanidine, tetramethyl thiuram disulfide, piperidinium pentamethylene dithiocarbamate, zinc dibutyl dithiocarbamate, hexamethylenetetramine, N - cyclohexyl - 2-benzothiazole sulfenamide, N - t-butyl-2-benzothiazole sulfenamide, N-cyclodiethyleneoxy-2-benzothiazole sulfenamide and zinc butyl xanthate, among others. One or more accelerator activator may be employed with any of the accelerators mentioned where desired, and such activators include the various derivatives of guanidine known in the rubber art, amine salts of inorganic and organic acids, various amines themselves, metallic oxides, stearic acid, alkaline salts such as sodium acetate and the like, as well as other activators known to the art. Additionally two or more accelerators or accelerator combinations may be employed in a single compound.

Vulcanizates of the rubbery polymers of the invention are often improved for specific applications by containing finely divided fillers or reinforcing pigments dispersed therethrough. Slightly reinforcing or nonreinforcing pigments include calcium carbonates, clays, soft carbon blacks, lithopone, and the like. Reinforcing pigments include the hard carbon blacks, such as the HAF, ISAF, SAF and SFF furnace blacks, the acetylene blacks, the various channel blacks, high modulus furnace blacks, zinc oxide, very fine silicas and calcium silicates. The particle sizes of the powdery fillers is quite small, and the reinforcing pigments are extremely fine, being colloidal in nature. From about 0.5 to 200 parts of fillers or pigments are included in many rubber compounds or stocks, depending upon the use to which the vulcanizates are to be put, all as is well known in the art of natural rubber compounding.

One or more antioxidants is usually included in a rubbery polymer of the invention, both to protect it (stabilize it) before vulcanization and later to protect the vulcanizate. The same antioxidant is often employed both as a stabilizer and also as an antiager for the vulcanizate. A wide variety of substances has been found to protect the novel polymers and vulcanizates from deterioration, coinciding to a large extent with the known antioxidants for natural rubber and including, without limitation, the various secondary amines, such as dioctyl-p-phenylenediamine, phenyl-beta-naphthylamine, acetonediphenylamine reaction products, 2,2,4 - trimethyl-6-phenyl-1,2-dihydroquinoline, the 2,2,4 - trimethyl-6-alkyl-1,2-dihydroquinolines, the alkoxydiphenylamines, the p-alkyldiphenylamines, N,N'-diphenyl-p-phenylenediamine, phenyl-alpha-naphthylamine, polymerized 2,2,4-trimethyl-1,2-dihydroquinoline; other amines such as m-tolylene diamine, p-aminodiphenylamine; phenolic compounds, such as 2,6-di-t-butyl-p-cresol, styrenated phenol or cresols, butyldehyde condensate of mono-t-butyl-m-cresol, formaldehyde condensate of 2-t-butyl-4-methylphenol, 2,4-diamylphenol sulfide, dialkyl hydroquinones.

Inherent viscosity values were obtained and used as indicative of the molecular weights of the polymers of the invention. These values, which appear in many of the examples hereafter, were obtained according to the proceduce of G. D. Sands and B. L. Johnson, Industrial and Engineering Chemistry, volume 19, page 261 (1947). In general, the molecular weight of individual molecules of the 1,4-polyisoprene of this invention can range from 10,000 or even lower to 2,000,000 or even higher. Average molecular weights are usually in the range of 50,000 to 1,500,000 and typical polymers of the invention possess inherent viscosity values indicating molecular weights on the order of about 200,000 to 500,000 and on up to about 1,000,000.

The crystalline polymers of the invention are characterized by a high content of all-cis, 1,4 head-to-tail polyisoprene of the following structure:

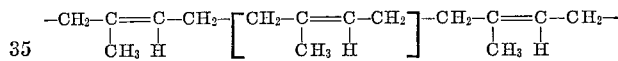

Consequently, the synthetic polyisoprenes of the invention combine the desired characteristics of both natural rubber and GR–S and thus may be fully substituted in part or entirely for natural rubber in a wide variety of applications where Hevea rubber alone has heretofore been satisfactory.

In accordance with the invention, it has been found that these superior and novel polyisoprene polymers may be prepared in the presence of selected catalyic materials under closely controlled and critical conditions.

According to the invention, the preferred catalytic material is metallic lithium or a compound or a complex containing lithium.[3] In order to produce the polyisoprenes of this invention with catalysts comprising lithium, it is essential that certain oxygen and nitrogen-containing modifiers previously used and recommended for use in alkali-metal catalyzed olefin polymerization systems be avoided. Particularly, such conventional alkali metal modifiers as dimethyl ether, diethyl ether, ethylene glycol dimethyl ether, diethylene glycol dimethyl ether, diethylene glycol, triethylene glycol, tetraethylene glycol, dioxane, and other oxygen-containing organic compounds should be avoided.

Also operable as catalysts in preparing the polymers the invention are the so-called "Ziegler catalysts," which are generally composite compositions comprising the reaction product of (a) hydrocarbon compound of a metal from Groups II or III of the Mendeleeff Periodic System, including hydrocarbon compounds of magnesium, zinc, aluminum, gallium or indium, and (b) a compound of a metal of Groups IV, V or VI of the Mendeleeff Periodic System.

Specific operable catalysts in the presence of which the novel isoprene polymers of the invention may be formed

---

[3] It has been established that all of the other alkali metals and their compounds are completely inoperable to produce polymers having the properties of the polyisoprenes of the invention.

and methods for preparation of these catalysts are as follows:

(I) METALLIC LITHIUM

Metallic lithium catalyst is readily prepared by melting lithium metal (M.P. 186° C.) immersed in a medium such as petroleum jelly and subjecting the molten mass to high speed agitation under an inert atmosphere to produce finely divided metallic lithium particles dispersed in the jelly. The function of the petroleum jelly is to prevent air from contacting the lithium metal. Any other medium which will perform this function may be substituted, for example, other inert hydrocarbon solvents boiling above 200° C., such as mineral oil, paraffin and the like may be employed. The preparation of the catalyst should be carried out in a closed container of non-reactive material, such as stainless steel or the like. Preferably, an amount of lithium will be employed sufficient to produce a dispersion containing from about 15 to about 50% metal, although other lithium concentrations may be employed as desired. A metal concentration of about 35% is preferred. Preferably, the particles of lithium will be characterized by a mean diameter of about 20 microns and a surface average of about 1 square meter per gram.

The activity of metallic lithium catalysts may be maintained at a high level by utilizing means which will continuously abrade the metal particles during the polymerization reaction. Such abrasion readily can be obtained by simply inserting inert metal rollers or balls, such as stainless steel balls, into the polymerization reaction and tumbling or turning the reactor in the conventional manner. It has also been found that the performance of metallic lithium as a catalyst in producing the improved polymers of the invention is enhanced by addition of small amounts of triphenylmethane to the polymerization recipe. Specifically, the addition of triphenylmethane is very effective in reducing the amount of gel content of the polyisoprene obtained. Amounts of triphenylmethane varying between about 0.05 and about 2.0 parts by weight per 100 parts of monomer may be employed.

(II) HYDROCARBON LITHIUM COMPOUNDS

The hydrocarbon lithium compounds are generally operable to produce the improved polymers of the invention and are hydrocarbons having, for example, from 1 to 40 carbon atoms in which lithium has replaced hydrogen. Suitable lithium hydrocarbons include, for example, alkyl lithium compounds such as methyl lithium, ethyl lithium, butyl lithium, amyl lithium, hexyl lithium, 2-ethylhexyl lithium, n-dodecyl lithium and n-hexadecyl lithium. Unsaturated lithium hydrocarbons are also operable, such as allyl lithium, methallyl lithium and the like. Also operable are the aryl, alkaryl, and aralkyl compounds, such as phenyl lithium, the several tolyl and xylyl lithiums, alpha- and beta-naphthyl lithium and the like. Mixtures of such hydrocarbon lithium compounds may also be employed. For example, desirable catalysts may be prepared by reacting an initial hydrocarbon lithium compound successively with an alcohol and then with an olefin such as isopropylene (a technique analogous to the "Alfin" technique), whereby a greater or lesser proportion of the lithium from the initial hydrocarbon goes to form lithium alkoxide and to form a new organo-lithium compound with the olefin.

Surprisingly, the catalytic action of the hydrocarbon lithium catalysts employed to produce the polyisoprenes of the invention does not appear to be affected by the presence of other alkali metal salt compounds as impurities. For instance, in the synthesis of hydrocarbon alkali metal compounds, alkali metal halides are produced as by-products, while in catalysts produced by the "Alfin" technique, alkali metal alkoxides are formed. Where in other polymerization reactions alkali metals other than lithium are employed, either in the form of the metal alone or in alkali metal hydrocarbons, these extraneous compounds exert a different effect upon the structure produced.

(a) Polylithium hydrocarbons

It has been discovered that faster polymerization reactions and polymers of higher molecular weight can be obtained by utilizing as a catalyst a polylithium hydrocarbon either alone or in admixture with other of the operable catalysts. Polylithium hydrocarbon catalysts differ from the generally operable lithium hydrocarbons in that lithium has replaced a plurality of hydrogen atoms instead of a single hydrogen atom. Suitable polylithium compounds include, without limitation, alkylene dilithium compounds, such as methylene dilithium, ethylene dilithium, dimethylene dilithium, trimethylene dilithium, pentamethylene dilithium, hexamethylene dilithium, decamethylene dilithium, octadecamethylene dilithium, 1,2-dilithium propane, and the like. Polylithium alkyl, alkaryl, and aralkyl compounds, such as 1,4-dilithium benzene, 1,4-dilithium naphthalene, 1,2-dilithium-1,2,3-triphenyl propane, and the like may be employed. Tri- and higher lithium hydrocarbons are also operable, such as 1,3,5-trilithium pentane or 1,3,5-trilithium benzene.

(b) Lithium dihydrocarbon amides

Excellent polymers are also obtained by employing lithium dihydrocarbon amides as catalysts having the formula:

wherein R is a hydrocarbon radical containing from 1 to 40 carbon atoms such as alkyl and cycloalkyl groups, for example, methyl, ethyl, propyl, isopropyl, butyl, isobutyl, tertiary butyl, the various pentyl groups, n-hexyl, cyclohexyl, 2-ethyl hexyl, decyl, dodecyl, and undecyl groups. The mixed alkyl radicals derived by the reduction of the fatty acid radicals of natural fats such as coconut oil, tallow and the like, hexadecyl, octadecyl, eicosyl, heneicosyl groups, and the like; and aryl, aralkyl and alkaryl groups such as phenyl, benzyl, phenyl ethyl, tolyl, xylyl, alpha- and beta-naphthyl, xenyl groups, and the like.

The lithium dihydrocarbon amide catalyst may be prepared by known reactions. A convenient method for preparing these compounds involves the reaction of a hydrocarbon lithium such as n-amyl lithium with an appropriate secondary amine in accordance with the equation:

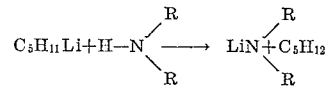

the radicals R being defined as above. The reaction is easily carried out at room or slightly elevated temperatures in closed containers of non-reactive materials such as glass, stainless steel, and the like.

(III) COMPOSITE COMPRISING (a) METALLIC LITHIUM AND/OR A HYDROCARBON LITHIUM COMPOUND AND (b) A SALT OF A COMPLEX ANION

It has been determined that excellent isoprene polymers characterized by higher cis and less trans structure, higher crystallinity and enhanced green strength may be prepared by employing a composite catalyst comprising (a) lithium metal or a lithium compound in which the lithium exerts a strong reducing action in association with (b) a substance having a high surface area such as to exert a directive and marshalling influence on the monomeric isoprene during the polymerization reaction. The metallic lithium and lithium hydrocarbons of (a) may be prepared as above described. Particularly good results are obtained when the (b) component is a salt of a complex anion containing boron, silicon, arsenic, or one of the heavy metals. For example, the lithium chloride by-product obtained by reacting lithium with chlorohydrocarbons consists of a matrix of lithium chloride containing metallic litihum dispersed therein in an extremely fine degree of sub-division. This composite material has been found to yield polyisoprene of improved microstructure, i.e., high cis-1,4-structure. Improved microstructure is also obtained with catalysts containing lithium metal intimately admixed with an oxide coated metal such as aluminum, iron and the like. Particularly preferred salts are those whose cations are electropositive metals and whose anions are complexes made up of heavy metals such as boron, silica or arsenic covalently linked to one or more negative groups so as to impart a negative charge to the group as a whole. In addition to the negative groups, the heavy metal may also have covalently linked thereto relatively neutral groups such as alkyl, aryl or other hydrocarbon groups, carbonyl groups, hydrate ($H_2O$) groups, the hydride radical or the like. By the term "heavy metal" is understood all those elements enclosed by the bracket entitled "Heavy Metals" and by the heavy black lines terminating at said bracket (including the lanthanides) in the periodic chart given in Lange's "Handbook of Chemistry," Fifth edition, Handbook Publishers, Inc., 1944, pages 54 and 55. These complex salts may in general be represented by the formula:

(1) $(M_{EP})_n[(M_H)_o X_p A_q]_r$ wherein $M_{EP}$ is an electropositive metal
$M_H$ is a heavy metal, boron, silicon or arsenic
X is an electronegative radical covalently linked to $M_H$
A is a neutral radical covalently linked to $M_H$
n, o, p, q and r are integers, with the proviso that q may be zero In general, although not necessarily, the maximum covalency, most commonly 6, will be elicited from the heavy metal $M_H$, so that if $V_H$=the covalency (usually the covalency maximum) of $M_H$
$V_X$=covalency of X
$V_A$=covalency of A
then $$oV_H = pV_x + qV_a$$

Also if $E_E$=positive electrovalence of $M_{EP}$
$E_H$=positive electrovalence of $M_H$
$E_X$=negative electrovalence of X
then $$nE_E = r(pE_X - oE_H)$$

Suitable elements which may be represented by $M_{EP}$ include any of the strongly electropositive metals, particularly the light metals such as lithium, sodium, potassium, rubidium, cesium, calcium, magnesium, and the like. Suitable elements which may be represented by $M_H$ include, as aforesaid, the heavy metal elements, boron, silicon and arsenic, typical examples of these being aluminum, titanium, mercury, vanadium, manganese, molybdenum, chromium, cobalt, iron, zinc, platinum, nickel, lanthanum, and the like. Suitable negative groups represented by the radical X are exemplified in fluorine, chlorine, bromine, iodine, oxygen and hydroxyl groups. Suitable neutral groups represented by the radical A are exemplified in hydrocarbon groups containing up to forty carbon atoms such as methyl, ethyl, propyl, butyl, pentyl, hexyl, phenyl and like groups, the carbonyl (CO) group, the hydrate ($H_2O$) group and the like. It will be understood that when any of the subscripts n, o p q and r are greater than one, the radicals to which they are appended need not be pure radicals but may be mixtures of radicals individually qualified for the positions they occupy. An extensive discussion of complexes is given in Ephraim "Inorganic Chemistry," Sixth edition, Interscience Publishers, Inc., chapters 10, 11 and 12. Typical complex anions which may provide the anion group $(M_H)_o X_p A_q$ of the salts (I) are exemplified in those of the formulae:

[AlCl$_6$]---    [AlF$_6$]---    [AlBr$_6$]---
[AlI$_6$]---    [AlOCl$_4$]---    [Al(CH$_3$)Cl$_5$]--
[ZnBr$_4$]--    [ZnBr$_5$]---    [PtCl$_6$]--
[PdCl$_6$]--    [SiF$_6$]--    [SaCl$_6$]--
[UO$_2$Br$_4$]--    [MoOF$_5$]$^V$    [TiF$_6$]--
[AlCl$_5$(H$_2$O)]--    [AlCl$_4$(H$_2$O)$_2$]---    [TiCl$_6$]--
[TiCl$_5$(C$_5$H$_{11}$)]-    [Ti$^{III}$Cl$_5$(C$_2$H$_5$)]--    [PtCl$_6$]--
[SiF$_6$]--    [BF$_4$]-    [ZnF$_6$]--
[AlO$_3$]---    [FeO$_3$]--    [Ti$^{III}$Cl$_6$]---

Particularly good results are obtained with composite catalysts in which the complex salt (B) was formed in situ in contact with the lithium-based catalyst component (a) by reaction of excess metallic lithium, or of a covalent or other lithium compound in which the lithium exerts a sufficiently strong reducing action to displace hydrogen from water (all of these may conveniently be supplied by an excess of the lithium-based catalyst component (A), the excess left over from the reactions discussed below serving as the component (A) in the composite catalyst, and the reaction product serving as component (B) upon a suitable heavy metal compound with reduction of the heavy metal; or conversely in which the metallic lithium or covalent lithium compound which is to serve as the lithium-based catalyst component (A) is generated in situ in contact with the complex salt component by reduction by a metal or covalent metal compound which is still more electropositive than lithium. The generalized reaction of lithium metal with a heavy metal compound to form such complexes is as follows:

(1)

$$u\text{Li} + v(M_H)vX_pA_q \longrightarrow \text{Li}_n[(M_H)_oX_pA_q]_r + M_H(\text{metallic}) + \text{LiX}$$
$$\text{(II)} \qquad\qquad \text{(I)} \qquad\qquad \text{(III)}$$

The above equation is not balanced, as the coefficients would unduly complicate the equation. The coefficients u and v will have values as required by the valences of the radicals involved. The notation is the same as that of Formula I above, with the addition of o', which is an integer which may be different from o to allow for changes in valency of $M_H$ and structure of the compounds in the course of the reaction. In some cases the heavy metal $M_H$ is not reduced to the free metallic state (III), in which case this term will not appear in the equation. Usually the lithium will be employed in excess, the unreacted portion supplying part or all of the lithium-based catalyst component (A). For instance, in a preferred embodiment, excess lithium metal is reacted with aluminum trichloride according to the reaction (2)    $3\text{Li} + 2\text{AlCl}_3 \rightarrow \text{Li}_3\text{AlCl}_6 + \text{Al}$ (metallic)

The excess lithium metal may serve as the lithium-based catalyst component (A) of the composite catalyst. As a measure of the excess lithum employed a value designated as the "stoichiometric excess" was defined as (2.1)    $S = \dfrac{[\text{Li}]}{[\text{AlCl}_3]} - \dfrac{3}{2}$ wherein S=the stoichiometric excess value
[Li]=moles of lithium used
[AlCl$_3$]=moles of aluminum trichloride used In the case of complexes other than those made from lithium metal and aluminum chloride, the stoichometric excess will be calculated by the formula (2.2)    $\dfrac{[\text{Li}]}{[(M_H)_{o'}X_pA_q]} - \dfrac{u}{v} = S$ in the case of complexes made by reaction of lithium metal in accordance with Equation 1 above or (2.3)    $\dfrac{[\text{LiR}]}{[(M_H)_{o'}X_pA_q]} - \dfrac{w}{x} = S$ in the case of complexes made by reaction of reducing lithium compounds in accordance with Equation 4 which follows.

In Equations 2.2 and 2.3

[Li]=moles of lithium used

[$(M_H)_n \cdot X_p A_q$]=moles of the compound $(M_H)_o \cdot X_p A_q$ used

[LiR]=moles of reducing lithium used, and $u$, $v$, $w$ and $x$ are the coefficients in Equation 1 above or Equation 4 below.

It was found that best results were obtained when the values of S were at least 2, and preferably 6 or more, when no lithium aromatic adduct is used in addition to the simple complex as described below. Preferred proportions for this latter case are set out in connection with the discussion of lithium aromatic adducts below. There would be no theoretical upper limit, save that imposed by economics. Polymerizations have been run with values of S as high as 25. The reaction of the lithium or reducing lithium compound with the aluminum trichloride or other heavy metal compound takes place readily at ordinary temperatures, for instance, by agitating the aluminum trichloride with finely divided lithium metal or compound. Analogous complexes may be produced by mixing and agitating metallic lithium or a lithium compound in which the lithium exterts a strong reducing action with oxides and halides of other appropriate metals. In some cases the oxide may be supplied as the oxide coating on the surface of metals, for instance, aluminum powder, iron powder, zinc powder and the like, containing oxide coatings may be reacted with lithium metal to yield composite catalysts for use in this invention. In such cases the oxide coating, to the extent that it may not be wholly reacted, will itself act as a substance exerting a directive influence on the monomeric diolefins during the polymerization.

The hydrate group ($H_2O$) was noted hereinabove as being a suitable component to serve as the neutral radical A. This group appears to be of particular advantage in securing the more rapid formation of the complexes and faster polymerization rates when the heavy metal $M_H$ involved is aluminum, titanium or boron. For instance, a more or less completely hydrated aluminum chloride may be employed as the starting heavy metal compound (II), the reaction with aluminum chloride monohydrate probably proceeding somewhat as follows:

(3) 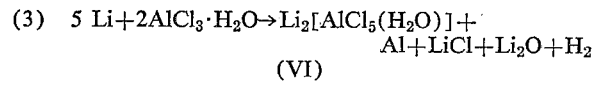

(VI)

The hydrogen atoms in the complex (VI) may probably be displaced to a greater or less extent by the lithium. Excellent results have been obtained with aluminum chloride containing 0.1 to 1.0 mole of water per mole of aluminum chloride. The same considerations of ratio of excess of lithium over aluminum chloride apply to the hydrated aluminum chloride as to the anhydrous aluminum chloride. Lithium will also react with boron fluoride hydrate ($BF_3 \cdot H_2O$) to yield efficient catalysts for use in this invention.

It was also brought out hereinabove that the complex might be made by the reducing action of covalent or other highly reducing lithium compounds such as lithium hydrocarbons or the like. In such cases the reaction may be written (4)

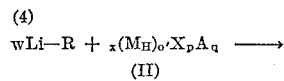

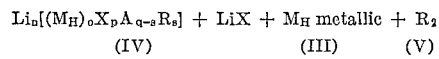

in which

R is a neutral radical such as a hydrocarbon radical coming within the class of neutral groups A as above defined, and $s$ is an integer or zero.

As in the case of reaction (1) above the free metal (III) may or may not appear, and the radicals R may all enter the complex (IV) rather than being liberated as the compound $R_2$ (V). In some cases the radicals R may not enter the complex (IV) at all, but may all appear in the compound $R_2$ (V). Particularly good results have been obtained by the reaction of lithium hydrocarbons (e.g., any of those described above as being suitable for use as the lithium-based catalyst component (A) upon titanium tetrahalides.) A variety of reductions and complex-formations takes place, the following being typical, using the same notation as was employed above.

(5)

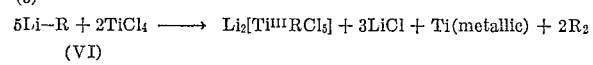

(VI)

It will be understood that, similarly as in the case of the reaction of lithium metal with a heavy metal compound to form the complex salt, the lithium hydrocarbon may be supplied in excess, the unused portion thereof serving to supply part or all of the lithium-dependent catalyst component (A). Conveniently, an excess of 0.001 to 10 moles of lithium hydrocarbon per mole of complex may be used. Titanium trichloride can be substituted for the tetrachloride in Equation 5 to produce useful catalysts.

While, as stated above, it is preferred to employ complexes that have been formed in situ by reduction of heavy metal compounds, it will be understood that complexes formed by other methods may also be employed. For instance complexes can be formed by the reaction of a salt of a highly electro-positive metal with a heavy metal compound, an example being of lithium chloride with aluminum chloride:

(6) 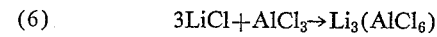

Complexes produced by the above and similar reactions can be mixed with lithium based catalysts, to provide the composite catalysts of this invention.

As noted above, lithium reacts with polynuclear aromatic hydrocarbons such as naphthalene, anthracene, biphenyl and the like to form salt-like addition compounds without replacing hydrogen in the hydrocarbon, see Paul et al., J.A.C.S. 78, 116 (1956). When these compounds are used as the lithium-based components (a) in combination with complexes (B) previously formed in accordance with reactions (1) or (4) above, particularly advantageous results are obtained, and sensitivity of the process to minor contaminations and variations of procedure is greatly reduced. It is believed, without absolute commitment to this theory, that the slope of the absorption curve of these lithium-aromatic compounds upon the surfaces of the complex compounds is very slight at the optimum concentrations for polymerization, so that unavoidable variations in the amount of the lithium-aromatic compound actually supplied (due to manipulative errors and/or destruction of the compound by oxygen or other contamination) will not greatly change the effective concentration of the lithium-aromatic compound in the theater of reaction. Suitable aromatic hydrocarbons forming addition products with lithium are exemplified in polynuclear aromatic, and alkylated aromatic, compounds, such as naphthalene, anthracene, chrysene, stilbene, diphenylmethane, fluorene, naphthacene, 1-methyl naphthalene, phenanthrene, acenaphthene, diphenyl, pyrene, triphenylene, dibenz (a, h.), anthracene, graphite, carbon black and the like. The complex salt with which the lithium-aromatic hydrocarbon compound is used may have been prepared with a stoichiometric excess within the ranges cited for this variable above. The mole ratio of lithium-aromatic hydrocarbon compound to the complex salt may be varied upwardly, from extremely small values, of say .01, there being no theoretical upper limit. Especially good results are secured when the ratio of the total moles of lithium metal used in the preparation of the aluminum chloride complex, plus the moles of lithium adduct to the moles of aluminum chloride used in the preparation of the complex is in the range 3.00–4.00, and when the ratio of moles of lithium adduct to moles of aluminum chloride used in the preparation of the complex is in the range of 0.01–0.25.

(IV) CRYSTALLINE SALTS IN ADMIXTURE WITH COLLOIDALLY DISPERSED LITHIUM METAL

Polyisoprenes containing a very high cis-1,4-content are obtained by employing as a catalyst a composite body comprising metallic lithium colloidally dispersed and associated with a matrix of a solid crystalline salt, the metal preferably being present in such an extremely fine dispersion that it imparts a characteristic blue coloration to the matrix, indicating that reduced lithium atoms are dispersed in the crystal lattice of the salt. Preferably, the salt is an alkali metal salt and desirably a lithium halide, such as lithium chloride. The dispersion of the lithium metal in association with the salt matrix may be effected in various ways. For example, a lithium halide or other salt may be exposed to an electron beam or other radiation sufficiently energetic to reduce a portion of the lithium ions in the salt's crystal lattice. Somewhat the same effect may be obtained by exposing a lithium salt such as lithium aluminum hexachloride or lithium aluminum tetraethyl to the action of a more electropositive material, for instance another alkali metal or a covalent derivative of another alkali metal such as an alkali metal hydrocarbon derivative. Likewise, the catalyst may be obtained by a process converse to the above in which metallic lithium is oxidized under somewhat hindered conditions to form the salt matrix. For instance, in the reaction of metallic lithium with alkyl, aryl or other hydrocarbon halides formed from hydrocarbon lithium, the lithium halide crystals formed contained metallic lithium dispersed in the lattices thereof as indicated by their blue coloration. Catalysts prepared in this manner should be isolated from the organolithium compound so produced in order to obtain full benefits of the catalyst since, although the organolithium compound is itself an operable catalyst, best results are obtained where the crystalline salt-lithium complex is employed in its pure form. The organolithium compound is removed by repeated washing with a suitable organic solvent. The salt-lithium complexes may also be obtained by electrolysis of fused lithium chloride or by dissolving lithium metal and a lithium salt, such as lithium chloride, in liquid ammonia and subsequently evaporating the ammonia.

(V) COMPOSITE COMPRISING (a) LITHIUM METAL OR LITHIUM HYDROCARBON IN ASSOCIATION WITH (b) A FLOURINE-CONTAINING SALT

Component (a) of this composite catalyst is prepared in accordance with the processes above disclosed. The salt of component (b) is any salt, the anions of which consist of or include fluorine, such as sodium fluoborate, potassium fluoborate, lithium fluoborate, sodium fluoride, potassium fluoride, calcium fluoride, magnesium fluoride, sodium fluotitanate, sodium fluosilicate, sodium fluoaluminate, barium fluoride salts, cryolite, cryolithionite and the like.

The composite catalyst is prepared by intimately admixing together the lithium or lithium-containing catalyst and the fluorine-containing salt. Preferably, this mixture is thoroughly agitated together for an extended period before contacting with the monomeric material. Since the advantageous catalytic effect appears to result from an interaction between the two components, most conveniently the mixing is done in the presence of an inert solvent such as those previously disclosed as being operable as a polymerization medium in the polymerization reaction. Some reaction, of obscure nature, appears to take place between the lithium or lithium-containing compound and the fluorine-containing salt, since suspensions of the composite catalysts have a swirling nacreous appearance and, where lithium metal is employed as one component of the catalyst, the lithium can no longer be seen floating on the surface of the suspension medium. In order to effect a thorough association of the lithium-dependent component and fluorine-containing salt, it is preferred to agitate or grind the components together for a substantial time, say for one hour or more. Conveniently, the agitation may be carried out with the materials suspended or slurried in a suitable inert organic solvent. The ratio of lithium-containing catalyst to fluorine-containing salt is not critical and may be varied, for instance, between 1–20 and 20–1 on a molar basis. The reaction between the components may take place at any desired temperature below the decomposition temperature of the salt but will preferably be conducted at room temperature.

(VI) ZIEGLER TYPE CATALYSTS

Also operable as catalysts in the production of the novel polyisoprenes of the invention are the Ziegler type catalysts. These catalysts are prepared by admixing a hydrocarbon compound of a metal of Group II or Group III of the Periodic System with an inorganic or organic compound of the metals of Groups IV, V or VI of the Periodic System. More specifically, metal hydrocarbons of beryllium, magnesium, calcium, zinc, strontium, cadmium, barium, radium, boron, aluminum scandium, gallium, yttrium, indium, lanthanum and thallium may be admixed with organic or inorganic heavy metal compounds of such metals as titanium, germanium, zirconium, tin, cerium, hafnium, lead, thorium, vanadium, columbium, antimony, tantalum, chromium, molybdenum, tungsten and uranium. Particularly effective catalysts are those formed from aluminum magnesium and zinc hydrocarbon compounds, preferably aluminum, magnesium and zinc alkyls with heavy metal halides and particularly titanium tetrachloride and titanium trichloride.

Improved results are also obtained by employing the Ziegler-type catalysts supported on a carrier or support such as silica, alumina, silica-alumina, diatomaceous earth, zirconia, zirconium silicate, talc, various clays and other amphoteric oxides, cryolite and the like. The amount of carrier may be varied considerably, but usually will be employed in the range of 0.5 to 10 parts by weight per 100 parts by weight of monomer.

The catalyst may be separately prepared prior to admixture with the monomeric material and, if desired, this preparation may be effected in the presence of an inert hydrocarbon solvent. Alternatively, and often more preferably, the catalyst is prepared in situ in the presence of the monomeric material by adding the two catalyst components to the monomer (and solvent if used). Polymerization in accordance with the invention is effected regardless of whether the catalyst is prepared separately and then admixed with the monomer or whether the catalyst is formed in situ. When the catalyst is formed in the presence of the monomer, the order of addition of the catalytic components is immaterial.

In order to produce the novel polymers of the invention, the proportion of metal hydrocarbon to heavy metal compound is critical. When a carrier is not employed and the molar ratio of the metal hydrocarbon to heavy metal is appreciably in excess of 2, commercially acceptable isoprenes are obtained which contain only about 50% or less of the desired cis-1,4-structure. When the molar ratio of the metal hydrocarbon to heavy metal compound is appreciably in excess of 2, commercialy acceptable yields are not obtained. Ratios of about one are preferred. When a carrier is employed, desirably high yields of cis-1,4- are not obtained when the metal ratio is substantially below 1.0. However, with the carrier, commercially acceptable yields are obtained with a ratio of metal hydrocarbon to heavy metal compound of up to about 5.0.

The hydrocarbon substitutents of the Groups II and III metals may vary widely and may include alkyl, aryl, alkaryl, aralkyl, cycloalkyl, alkyl cycloalkyl, cycloalkyl alkyl, the hydrocarbon substituents being sufficient in number to satisfy the valence of the metal. The hydrocarbon constituents may be the same or different.

It is essential that air be excluded during the preparation of all of the catalyst materials described. Thus, whether the catalyst be lithium metal, lithium-containing compounds, or Ziegler-type catalysts, it is necessary that the catalyst be prepared in closed containers provided with means for exclusion of air. Preferably, the catalyst will be employed shortly after preparation, although the catalyst may be stored for reasonable periods of time if substantial contact with the atmosphere is prevented during removal from the vessel in which the catalyst is prepared, during storage and during subsequent introduction into the reaction chamber. As will be illustrated, the catalyst often may be produced in situ in the reaction vessel.

In general, the larger the amount of catalyst used the more rapidly the polymerization will proceed at a given temperature and the lower the molecular weight of the resulting product. Desirably, sufficient catalyst should be employed to provide from 0.001 to about 0.5 gram of active metal for each 100 grams of isoprene in the polymerization mixture.

All of the above catalysts, with or without supports or carriers, have been found to direct the polymerization of isoprene under proper conditions to a structure which is substantially entirely cis-1,4- in nature with either substantial absence or presence of only a minor proportion of the trans-1,4 configuration, substantially no 1,2-structure and at most a minor proportion of 3,4-structure.

Once a pure catalyst has been prepared, the most important factors influencing the structure and properties of the polymers of the invention. By isoprene of high yield are:

(1) Purity of monomer
(2) Concentration of moisture, oxygen and air
(3) Temperature of the reaction.

PURITY OF MONOMER

Isoprene of high purity is essentially to the production of the polymers of the invention. By isopreene of high purity is meant an isoprene of at least more than 90% mole purity and preferably in the neighborhood of 95 or more percent mole purity. In general, the purer the isoprene, the faster the reaction rate, and the closer the properties of the resulting polymer to natural rubber. Acetylene or other unsaturates, such as olefins and other diolefins, should desirably be kept at a minimum or else removed prior to use since these impurities tend to lower the resulting molecular weight of the polymer. Any inhibitor normally present in a commercial isoprene must be removed prior to polymerization. Excellent polymers have been obtained from pure grade [4] or research grade [5] isoprene. The only purification required of these monomers prior to use is the removal of the inhibitor therefrom. Desirable polymers in accordance with the invention may also be produced from a less pure commercially available grade of isoprene having a purity of about 91 to 93 mole percent [6] and containing amounts of acetylene and various other unsaturates, provided the acetylene is removed and the unsaturated impurities are reduced by use of known chemical and fractionating methods.

It is desirable that the isoprene monomer be handled at all times in contact only with its own vapor or with atmospheres containing only its own vapor and an inert gas, such as helium or argon. Particularly to be avoided is the presence of oxygenated organic compounds such as ethers, esters and the like, which, in prior polymerization procedures, have often been considered as indispensable constituents of alkali-metal-base catalyst systems. In order to obtain the polymer of this invention, these materials must be rigorously excluded from the reaction mixtures. Moreover, nitrogen and nitrogenous compounds such as amines and the like must also be excluded where a lithium-containing catalyst is employed. Nitrogen atmospheres are desirable only with catalyst systems which do not contain lithium.

CONCENTRATION OF MOISTURE, OXYGEN AND AIR

Since moisture tends to use up catalyst, it should be excluded from the reaction zone insofar as is possible. Oxygen, nitrogen and other components of the air seriously inhibit the desired polymerization reaction and consequently should be excluded from the reaction zone. In laboratory or small scale equipment, all of these substances conveniently may be removed by bringing the polymerization charge to a boil and venting a small proportion of the charge (e.g., about 10%) prior to sealing the reactor and effecting polymerization. In large scale production, however, charging of the reactor is preferably conducted under an inert atmosphere.

TEMPERATURE

It has been found that the molecular weight and proportion of cis-1, 4-structure of the polymers in accordance with the invention generally increase as the temperature of polymerization is decreased. Additionally, the reaction is quite difficult to control at elevated temperatures, particularly where isoprene of the preferred purity is employed. It has been found that the gel content of the polymer increases as the polymerization temperature increases especially when lithium dependent catalysts are employed. Consequently, it is desirable to operate at the lowest temperature at which a practical yield of the desired product can be obtained. Since polymerization reactions of the type contemplated ordinarily require a considerable induction period, it is often desirable to initiate the polymerization reaction at a higher temperature, i.e., at a temperature in excess of 30° C., and then lower the temperature to the desired level by suitable cooling means once the polymerization reaction has been initiated. In this manner, the induction period is lessened and the benefits of low temperature polymerization, as above indicated, are obtained. In general, the polyisoprenes of the invention are produced at temperatures between −100° C. and 150° C. A polymerization temperature of from −40° to 80° C. is preferred.

In accordance with the invention, the pure isoprenes essential to the invention may be polymerized in either liquid or vapor phase, but desirably the reaction will be carried out in the presence of a suitable inert organic solvent. Solvents operable in the process whereby the polymers of this invention are produced must be nonpolar, non-acidic, organic substances. Suitable solvents include the saturated aliphatic hydrocarbon solvents, such as the straight and branched chain paraffins and cycloparaffins containing from 3 to 16 carbon atoms which include, without limitation, propane, pentane, hexane, petroleum ether, heptane, dodecane, cyclopentane, cyclohexane, methyl cyclohexone and the like. Aromatic solvents such as benzene, toluene, a xylene and the like are also operable. The same considerations as to purity and absence of interfering compounds applying to the isoprene isomers also apply to the solvent. A treatment which has been found particularly advantageous for the purification of paraffin solvents, such as petroleum ether, consists of agitating the solvent with concentrated sulfuric acid and thereafter repeatedly washing with water. The solvent may then be suitably dihydrated by passage through silica gel, alumina, calcium chloride or other dehydrating or absorbing media, and thereafter distilled. As in the case of the isoprene monomer, the solvent after being purified desirably should be handled in contact only with its own vapor or with atmospheres containing only its vapor and inert gases such as helium and argon.

---

[4] Supplied by Phillips Petroleum Co. and reported to have a purity of 99 mole percent and a refractive index at 20° C. of 24 $n_D^{20}$=1.422.
[5] Supplied by Phillips Petroleum Co. and reported as having a purity of 99 mole percent and a refractive index at 20° C. of $n_D^{20}$=1.422.
[6] Isoprene of this degree of purity is supplied by Enjay Co. at 20° C. in the range of about $n_D^{20}$=1.4210 to 1.4216.

THE POLYMERIZATION REACTION

Laboratory scale polymerization of isoprene to produce the polymers of the invention may conveniently be conducted in glass beverage bottles sealed with aluminum lined crown caps. The polymerization bottles should be carefully cleaned and dried before use. The catalyst employed may be added to the bottle by weight, or where possible, the catalyt can be melted and added by volume. In some instances, it is desirable to add the catalyst as a suspension in the monomer. The monomer is added by volume, desirably employing sufficient excess so that about 10% of the charge can be vented to remove moisture, oxygen and air from the bottle. The removal of oxygen from the free air space above the monomer in the polymerization bottle as well as dissolved oxygen in the monomer is an important step in the bottle loading procedure. The cap is placed loosely on the bottle and the monomer is brought to a vigorous boil as by placing the bottle on a heated sand bath. When approximately 10% of the charge has been vented, the bottle is rapidly sealed. Such procedure substantially excludes the air and oxygen which drastically inhibit polymerization.

The sealed bottles may be placed on a polymerization wheel immersed in a liquid maintained at a constant temperature, and rotated. Alternatively, the charge bottle may be allowed to stand stationary in a constant temperature bath or otherwise heated or cooled until the polymerization reaction is complete. Ordinarily, the static system requires a considerably longer reaction time but, due to the relative slowness of the reaction, it may be in some instances be attractive where products having higher molecular weights are desired. After the induction period, the charge goes through a period of thickening and finally becomes solid. At the end of the polymerization reaction, when properly conducted, all of the monomer has been consumed and there is a partial vacuum in the free space of the reaction vessel.

After polymerization has been completed, and the bottle cooled to handling temperature, the polymer may be removed by cutting the bottle open. Preferably the crude polymer will be washed immediately on a wash mill to remove the catalyst. An antioxidant, for example, 3% phenyl-betanaphthylamine, is desirably added as soon as the catalyst has been destroyed and water washing is then resumed. Cold water will preferably be employed to minimize oxidation of polymers. In order to recover the polymer with a minimum degree of oxidation, it is preferred that the polymer, after being removed from the reaction vessel, be immediately immersed in an alcohol, such as methanol, containing about 3% antioxidant. The methanol destroys the catalyst and carries the antioxidant into the polymer mass.

Corresponding techniques can be employed in large scale polymerization processes. Usually the reaction is carried out in a closed autoclave provided with a heat transfer jacket and a rotary agitator. Avoidance of oxygen contamination is most easily secured by evacuating the vessel prior to charging the isoprene (and solvent, if used) and employing an inert atmosphere. To insure the purity of the monomer and solvent, a silica gel or other suitable absorption column is preferably inserted in the charging line employed for introduction of these materials to the reactor. The catalyst is preferably charged last, conveniently from an auxiliary charging vessel pressured with an inert gas and communicating with the polymerization vessel through a valved conduit. It is desirable to provide a reflux condenser to assist in the regulation of the reaction temperature. Upon completion of polymerization, the product is removed and immersed under the surface of the body of methanol, isopropanol, or other alcohol containing an antioxidant, and agitated therewith to precipitate the polymer, destroy the catalyst and incorporate the antioxidant. The precipitated mass may be milled with water on a wash belt to remove the alcohol and additional antioxidant may be incorporated during this operation. The product is then dried for storage and use.

INFRA-RED SPECTROSCOPIC DETERMINATION OF THE MICROSTRUCTURE OF POLYISOPRENE

The amounts of cis 1,4-, trans 1,4-, 1,2- and 3,4-structure in polyisoprene are determined by an infra-red spectoscopic method devised by J. L. Binder and associates. The relative amounts of the four structures named are found by measuring the intensities of the infra-red adsorption bands at 8.85, 8.68, 10.98 and 11.25 microns for the four types of structures, in the order given above and inserting these values into the equations:

(1)  $D^i = e^i_1 C_1 + e^i_2 C_2 + e^i_3 C_3 + e^i_4 C_4$ where $D^i$ = absorbance (optical density) of the polymer at wavelength $i$ $e^i_{1,\,2,\,3\text{ or }4}$ = the absorptivities of the several structures at wavelength $i$, the subscripts 1, 2, 3, or 4 referring to the several component structures, and $C_{1,\,2,\,3\text{ or }4}$ = the concentration of the several structures, the subscripts 1, 2, 3, or 4 referring to the several component structures.

The four equations obtained in this way were solved for $C_1$, $C_2$, $C_3$, and $C_4$, the values of the concentrations of the cis 1,4-, trans 1,4-, 1,2-addition and 3,4-addition in the polymer.

The peak wavelengths selected and the values of the absorptivities $e^i$ for these wavelengths for the several structures are tabulated herewith:

| Structures | Molar absorptivities $e^i$ at wavelength of— | | | |
|---|---|---|---|---|
| | 8.68 microns | 8.85 microns | 10.98 microns | 11.25 microns |
| 1,2-addition | 3.0 | 3.0 | 149.0 | 9.0 |
| 3,4-addition | 1.5 | 2.0 | 7.0 | 145.0 |
| Cis-1,4-addition | 3.583 | 6.518 | 1.860 | 1.530 |
| Trans-1,4-addition | 5.927 | 1.934 | 2.277 | 1.885 |

In the detailed examples given hereinafter, percentage values are given for the various types of unsaturation. These are derived by dividing the absolute concentration of each type of unsaturation by the sum of the concentrations of the four types of unsaturation (1,2-; 3,4-cis and trans-) determined, and multiplying by 100%, so that the sum of the percentages given will always be 100%. In order to assess the accuracy of the determination, a further figure is given, namely total unsaturation found. This is the quotient of the sum of the concentrations of the various types of unsaturation found by infra-red analysis, divided by the theoretical concentration of all unsaturation which should be present in the sample, assuming that the polyisoprene is constituted solely of

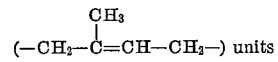

$(-CH_2-C(CH_3)=CH-CH_2-)$ units

X-RAY DIFFRACTION EVIDENCE OF POLYISOPRENE MICROSTRUCTURE

X-ray diffraction patterns of the polyisoprene of the invention are very similar to the patterns obtained from Hevea rubber. A very strong crystalline fiber pattern has been obtained for Hevea stretched 200% and strong to very strong crystalline fiber patterns have been obtained for polyisoprenes of the invention elongated as low as 400%. Conventional synthetic polyisoprenes shown no crystalline pattern whatsoever. Balata exhibits a crystalline pattern, but one entirely different from that of Hevea. The X-ray diffraction pattern for Balata is typical for crystalline powders.

Having generally described the invention, the following examples are presented to illustrate the preparation of various operable catalysts and the polymerization of isoprene in the presence of these catalytic materials.

EXAMPLE 1

(A) Catalyst preparation

Thirty-five parts of lithium metal and 100 parts of petroleum jelly were introduced into a stainless steel reaction vessel, the metal being immersed in petroleum jelly. The temperature of the metal and jelly was raised sufficiently to melt the lithium and the molten mass was agitated at high speed to disperse the molten lihium in the petroleum jelly. The mass was then cooled to produce a dispersion of particulate lithium having a particle size of about 20 microns and a surface area of about one square meter per gram in petroleum jelly.

(B) Polymerization

One hundred parts by weight of isoprene (purified to a mole percent purity of approximately 95% by mixing with methyl ethyl ketone, washing and redistilling) and 2.5 parts by weight of the above dispersed lithium catalyst were introduced into a glass bottle. The bottle was flushed out with inert gas and loosely sealed by capping. The sealed bottle was then placed on a polymerization wheel immersed in water maintained at a temperature of 70° C. and the wheel was rotated. Polymerization of the contents of the bottle was noted to be completed after about 116 hours with all of the monomer having been consumed and a partial vacuum being formed in the free space of the bottle.

After cooling, the bottle was cut open; the polymer, which was solid and dark green in color, was removed and washed on a mill. Santovar-O [7] as a stabilizer and phenyl-beta-naphthylamine as an antioxidant were added to the polymer on the mill. The microstructure of the polymer was determined by infra-red technique and found to be 77% cis-1,4-; 12.1% trans-1,4-; 0.3% 1,2-; and 11% 3,4-addition products.

EXAMPLE 2

Using the same general technique related in Example 1, two additional polymerizations were carried out, each utilizing 100 parts by weight isoprene (purified to a mole percent purity of approximately 95% by distilling off of metallic sodium) and 2.5 parts of the same lithium dispersion used in Example 1. Polymerization was in each case carried out at 70° C. The resulting polymers (hereafter referred to respectively as polymer 2a and polymer 2b) were each recovered and compounded according to the following typical tire body stock recipe:

| | Parts by weight |
|---|---|
| Polymer | 100.0 |
| Sulfur | 3.0 |
| Channel Black | 30.0 |
| Processing oil | 9.0 |
| Stearic acid | 2.5 |
| Zinc oxide | 4.0 |
| Accelerator | 2.7 |
| Phenyl-beta-naphthylamine | 0.6 |

For purposes of comparison a compound of GR-S 1500 was also prepared using the same general recipe outlined above. Physical properties of the three compounds were determined and were as follows:

[7] An alkylated polyhydroxy phenol supplied by Monsanto Chemical Co.

| | | Polymer | |
|---|---|---|---|
| | GR-S | 2a | 2b |
| Cures at 280° F.: | | | |
| 300% modulus (p.s.i.) at minutes cure: | | | |
| 30 | 50 | 700 | 425 |
| 45 | 100 | 675 | 325 |
| 60 | 450 | 625 | 275 |
| 90 | 775 | 600 | 250 |
| Tensile at break (p.s.i.) at minutes cure: | | | |
| 30 | 50 | 1,325 | 1,350 |
| 45 | 1,700 | 1,275 | 1,250 |
| 60 | 2,575 | 1,275 | 1,375 |
| 90 | 2,275 | 1,050 | 1,125 |
| Cures at 280° F.: | | | |
| Elongation, percent, at minutes cure: | | | |
| 30 | 1,020 | 430 | 560 |
| 45 | 800 | 420 | 540 |
| 60 | 680 | 420 | 590 |
| 90 | 480 | 400 | 540 |
| Cured 90 minutes at 280° F., ring tensile at 212° F.: | | | |
| Tensile at break (p.s.i.) | 375 | 275 | 325 |
| Elongation, percent | 190 | 150 | 180 |
| Cured 60 minutes at 280° F., forced vibrator at 100° C.: | | | |
| Dynamic modulus, p.s.i. | 109 | 100 | 77 |
| Internal friction, kilopoises | 2.1 | 0.8 | 0.8 |

Referring to the above, it is seen that the hysteresis characteristics of stocks containing polymers of the invention (polymers 2a and 2b) are outstanding. These stocks compare quite favorably with regard to hysteresis normally displayed by Hevea stocks as distinguished from known synthetic rubbers such as GR-S.

EXAMPLE 3

A high pressure stainless steel bomb provided with a rocking assembly and heating means was charged with 100 parts by weight of distilled isoprene [8] and 0.5 part metallic lithium (as a 20% dispersion in petrolatum) and flushed out with isoprene fumes. The bomb was then sealed and subjected to a temperature of 150° F. A temperature rise began 29 hours after charging and the temperature reached a maximum of 220° F. 90 minutes after beginning to rise. After an additional 90 minutes the temperature returned to and was maintained at 150° F. for two hours. The bomb was agitated over a weekend whereupon it was opened and the polymer was recovered; excess catalyst was removed by partially dissolving in a mixture of 90 parts benzene and 10 parts methanol; the major proportion of solvent was removed by evaporation; and the polymer was washed on a mill. The resulting polymer contained by infra-red analysis 82.7% cis-1,4-; 10.9% trans-1,4-; no 1,2- and 6.2% 3,4-addition products.

EXAMPLE 3a

Another polymer in accordance with the invention was prepared by polymerizing 100 parts by weight of Enjay [8] isoprene (purified by distilling off from metallic sodium) at 50° C. in the presence of 1.0 part by weight metallic lithium (as a 35% dispersion in petrolatum) using the same general procedure outlined in Examples 1 and 2. The polymer as prepared and smoked sheet natural rubber were separately milled in order to compare the characteristics of the polymers after the milling operation. The following results were obtained:

[8] Purified to a purity of about 95 mole percent.

BREAKDOWN CHARACTERISTICS OF POLYMERS UPON MILLING

| | | Inherent viscosity | | Molecular weight×10⁻³ after purification |
|---|---|---|---|---|
| Polymer | Degree of milling | Before purification | After purification | |
| Polymerized at 50° C. | None | 5.8 | 7.0 | 669 |
| | 20 pass | 2.0 | 2.2 | 230 |
| | Complete breakdown (dead milled). | 1.5 | 1.7 | 178 |
| Smoked sheet | None | 6.3 | 7.4 | 680 |
| | 20 pass | 2.6 | 2.8 | 265 |
| | Complete breakdown (dead milled). | 1.3 | 1.6 | 141 |

EXAMPLE 4

Several large scale polymerizations were carried out in accordance with the invention using the general polymerization formula:

| | Parts by weight |
|---|---|
| Isoprene (having a mole purity of about 95% or higher) | 100 |
| Lithium metal (dispersed in petrolatum) | 0.15–0.5 |

Polymerizations were effected in the range of about 50° C. to 70° C. Polymerization procedure and recovery of polymer were in each case in accordance with that used in previous examples.

Four of the polymers, thus prepared, and control samples of typical Hevea, Balata, and emulsion bulk polymerized isoprenes were subjected to infra-red analysis and X-ray diffraction. The results are shown in the following table:

| | Infra-red | | | | X-ray diffraction | |
|---|---|---|---|---|---|---|
| Polymer | Cis-1, 4% | Trans-1, 4% | 1, 2% | 3, 4% | Elongation, percent | Hevea crystalline pattern |
| Hevea | 97.7 | 0 | 0 | 2.3 | 400 | Very strong. |
| Balata | 0 | 98.7 | 0 | 1.3 | | None. |
| Polymer: | | | | | | |
| 4A | 91.3 | 0.14 | 0.0 | 8.6 | 600 | Strong. |
| 4B | 86.2 | 5.9 | 0.3 | 7.6 | 1,700 | Do. |
| 4C | 81.6 | 9.7 | 0.4 | 8.2 | 2,100 | Very strong. |
| 4D | 91.5 | 0.0 | 0.1 | 8.4 | 1,300 | Strong. |
| Emulsion | 21 | 66 | 6 | 7 | 900 | None. |
| Bulk (peroxide) | 29 | 60 | 6 | 5 | | Do. |

Gum stocks were prepared from one of the polyisoprene polymers produced as above and a commercial GR-S synthetic rubber produced by emulsion polymerization at 41° F. The following modulus, tensile and elongation values were obtained for the cured products of the following general recipe:

| | Parts by weight |
|---|---|
| Polymer | 100.0 |
| Zinc oxide | 5.0 |
| Stearic acid | 3.0 |
| Softener | 3.0 |
| Accelerator | 1.5 |
| Alkyl phenol polysulfide | 1.0 |
| Antioxidant | 1.0 |

COMPARISON OF LITHIUM POLYISOPRENE WITH GR-S (41° F.) AND NATURAL RUBBER IN A GUM FORMULA

| | Natural rubber | GR-S | Lithium polyisoprene |
|---|---|---|---|
| Cured at 280° F.: | | | |
| 600% modulus (p.s.i.): | | | |
| 30 minutes | 775 | 50 | 225 |
| 60 minutes | 1,000 | 150 | 300 |
| 90 minutes | 1,100 | 125 | 300 |
| Tensile at break (p.s.i.): | | | |
| 30 minutes | 3,225 | 275 | 1,925 |
| 60 minutes | 3,125 | 250 | 3,000 |
| 90 minutes | 2,850 | 225 | 2,400 |
| Elongation at break (percent): | | | |
| 30 minutes | 820 | 1,000 | 1,160 |
| 60 minutes | 760 | 740 | 1,060 |
| 90 minutes | 700 | 700 | 990 |

Polyisoprene polymer, as above prepared, and a standard GR-S rubber produced by emulsion production at 41° F. were loaded with 35 parts of EPC black generally according to the following recipe:

| | Parts by weight |
|---|---|
| Polymer | 100.0 |
| Carbon black | 35.0 |
| Zinc oxide | 5.0 |
| Stearic acid | 3.0 |
| Softener | 3.0 |
| Alkyl phenol polysulfide | 5.0 |
| Accelerator | 1.2 |
| Antioxidant | 1.0 |

The reinforced rubber possessed properties as shown below:

| | Natural rubber | Lithium polyisoprene | Emulsion polyisoprene | 41° F GR-S |
|---|---|---|---|---|
| Cures at 280° F.: | | | | |
| 300% modulus (p.s.i.): | | | | |
| 30 minutes | 750 | 325 | | 300 |
| 45 minutes | 900 | 375 | | 550 |
| 60 minutes | 1,000 | 400 | | 700 |
| 90 minutes | 1,100 | 425 | | |
| Tensile strength (p.s.i.): | | | | |
| 30 minutes | 3,950 | 3,575 | 525 | 3,275 |
| 45 minutes | 4,350 | 3,625 | 575 | 3,650 |
| 60 minutes | 4,275 | 3,775 | 575 | 3,800 |
| 90 minutes | 4,800 | 3,800 | 550 | |
| Shore A Hardness [1] | 39 | 43 | | 55 |
| Forced vibrator at 100° C.: [1] | | | | |
| Dynamic modulus (p.s.i.) | 89 | 111 | 137 | 218 |
| Static modulus (p.s.i.) | 75 | 93 | | 150 |
| Internal friction (k.p.s.) | 1.6 | 1.7 | 1.2 | 4.2 |
| Ring tensile strength at 212° F.: [1] | | | | |
| Tensile (p.s.i.) | 2,400 | 2,025 | 300 | 525 |
| Elongation (percent) | 745 | 890 | 90 | 325 |
| Young's bending modulus (temperature, ° F., for $10^4$ p.s.i.) | −58 | −56 | | −44 |

[1] Sample cured 45 minutes at 280° F.

It will be seen that the high tensile properties of polyisoprenes of the invention were substantially retained at the high temperature of 212° F. and are comparable to those of natural rubber. The hysteretic and elastic properties of the novel polyisoprene approached those of the natural rubber compound and are obviously much superior to the GR-S stock as measured by the forced vibrator test of J. H. Dillon, I. B. Prettyman and G. L. Hall, Journal of Applied Physics, vol. 15, pp. 309–323 (1944). Moreover, the polysoprene of the invention remains flexible and usable at lower temperatures than does the GR-S stock, as shown by Young's bending modulus value obtained in accordance with Liska and Grover U.S. Pat. 2,404,584.

Polyisoprene of the invention was evaluated as a replacement for natural rubber in truck tire body stocks. Three tires (9.00/20–10 ply rating) having body stocks of polyisoprene of the invention and Hevea treads were constructed. Three control tires from natural rubber and also three control tires with bodies of standard GR-S polymerized at 41° F. were built. The total synthetic rubber content of the test tires and of the GR-S control tires was 50% each. The nine tires were then subjected to a crown break test as follows:

Each tire was mounted, inflated to a standard pressure, overloaded to the same degree, and then allowed to rotate against the periphery of a driven wheel having a diameter of about ten feet. The wheel was initially rotated at a peripheral speed of about 35 miles per hour, and the speed was periodically advanced by regular increments until the test tire failed because of either a crown break or a ply separation. The results of this test are given below:

INDOOR TRUCK TIRE TEST

| Tire body construction | Type of failure | Miles to failure | Average performance index |
|---|---|---|---|
| Lithium polyisoprene | | | 112 |
| Tire A | Crown break | 1,199 | |
| Tire B | do | 1,151 | |
| Tire C | do | 1,109 | |
| Natural rubber | | | 100 |
| Tire A | Crown break | 1,204 | |
| Tire B | do | 952 | |
| Tire C | do | 930 | |
| GR-S | | | 88 |
| Tire A | Crown break | 1,030 | |
| Tire B | Ply separation | 963 | |
| Tire C | do | 728 | |

Road tests were made on tires having treads and/or side walls of polyisoprene prepared as above in comparison with control tires having natural rubber treads and side walls. A striking difference between the two sets of tires was noted. The natural rubber treads and side walls cracked badly in service whereas the polyisoprene test tires displayed very few cracks. Additional tests established that the crack initiation resistance of tread and side wall stock of synthetic polyisoprene rubber of the invention is markedly superior to the crack resistance of natural rubber and equal to the crack resistance of the best commercial grade of GR–S synthetic rubber.

Additional tests established that the cut growth resistance of tread and side wall stocks of the polyisoprenes of the invention is equivalent to the cut growth resistance of natural rubber stocks and markedly superior to the cut growth resistance of the best available GR–S rubber.

Similarity in molecular weight distribution of polymers of the invention in comparison with natural rubber is illustrated in the following table where molecular weight distribution in terms of inherent viscosity of two of the polymers produced as outlined above are compared with molecular weight distribution of a typical pale crepe:

| Polymer | Acetone extract | Inherent viscosity range | | | | | | | Gel |
|---|---|---|---|---|---|---|---|---|---|
| | | 0-2 | 2-4 | 4-6 | 6-8 | 8-10 | 10-12 | Over 12 | |
| Pale crepe | 3.6 | 4.6 | 6.8 | 8.5 | 7.7 | 11.2 | 24.9 | 7.0 | 26.3 |
| 4E, polymerized at 40° C | 3.1 | 1.9 | 10.4 | 11.9 | 16.4 | | | | 56.3 |
| 4F, 4E after 3 minutes milling | 3.1 | 11.0 | 30.1 | 42.6 | 11.7 | | | | 1.5 |
| 4G, polymerized at 60° C | 4.7 | 11.3 | 13.0 | 7.0 | 10.0 | | | | 54.0 |

Though some polymers produced at 40 to 60° C. possess about 50% gel, these polymers can readily be broken down by light milling without excessive increase in low viscosity polymer, as is shown above.

EXAMPLE 5

Two reaction vessels were charged identically with isoprene [9] and 0.1 part lithium sand (35 parts lithium in 65 parts petroleum jelly) per 100 parts monomer. Polymerization was carried out in one of the reaction vessels by initiating polymerization at 50° C.; then transferring the contents of the reaction vessel to another reaction container having means associated therewith for maintaining a temperature of 0° C., wherein polymerization was completed at 0° C. The other reaction vessel was also heated to 50° C. to initiate polymerization but at this point the reaction became uncontrollable and a portion of the resulting polymer burned to an extremely soft black sticky mass; the remaining portion of the polymer did not appear burned. Microstructure determinations were made by infra-red technique as follows on the polymer from the first reactor (Sample 1), on the apparently unburned portion of the polymer of the second reactor (Sample 5a) and on the burned portion of the polymer from the second reactor (Sample 5b). Inherent viscosity and percent gel were determined on Samples 1 and 5a. The results of these determinations were as follows:

| | Sample 1 | Sample 5a | Sample 5b |
|---|---|---|---|
| Gel, percent | 5.50 | 1.00 | |
| Inherent viscosity | 7.87 | 3.84 | |
| Cis-1,4, percent | 93.40 | 89.50 | 74.4 |
| Trans-1,4, percent | 0.00 | 1.40 | 13.2 |
| 1,2, percent | 0.08 | 0.00 | 0.0 |
| 3,4, percent | 6.50 | 9.10 | 12.0 |

Here, it is seen that control of the reaction by lowering the polymerization temperature after the induction period is effective in producing polymers of higher cis-1,4-structure.

---
[9] Supplied by Phillips Petroleum Company (pure grade).

EXAMPLE 6

Two reaction vessels were charged with isoprene and 0.22 part by weight of lithium sand (35 parts lithium in 65 parts petroleum jelly). Polymerization of the ingredients of the first reaction vessel was carried out by initiating polymerization at 40° C.; then reducing the temperature and carrying out the major proportion of the polymerization at 0° C. to produce polymer 6a. The ingredients of the second reaction vessel were polymerized to completion at 40° C. to produce polymer 6b. Inherent viscosity, gel content and infra-red microstructure determinations were made on the polymers 6a and 6b and were as follows:

| | Polymer 6a | Polymer 6b |
|---|---|---|
| Gel, percent | 3.20 | 56.30 |
| Inherent viscosity | 9.75 | 5.22 |
| Cis-1,4, percent | 92.30 | 86.20 |
| Trans-1,4, percent | 1.50 | 5.90 |
| 1,2, percent | 0.00 | 0.30 |
| 3,4, percent | 6.20 | 7.60 |

EXAMPLE 7

A blend of several individual polymers produced according to substantially the same procedure as the polymer Sample 6a above (the blend having an inherent viscosity of 5.8, a gel content of 3.8 and a structure by infra-red technique of 93.7% cis-1,4-; no trans-4,4-; 0.1% 1,2-; and 6.3% 3,4-addition products) was compounded according to the following tire tread recipe:

| | Parts by weight |
|---|---|
| Polymer | 100.00 |
| Zinc oxide | 3.00 |
| Stearic acid | 2.60 |
| Softener | 3.00 |
| Sulfur | 2.60 |
| Accelerator | 0.75 |
| Antioxidant | 1.60 |
| Carbon black | 50.00 |

For comparison purposes Hevea rubber was compounded according to the same tire tread formula. Physical properties of the two compounds were determined and were as follows:

| | Polyisoprene blend | Hevea |
|---|---|---|
| Cured 60 minutes at 280° F.: | | |
| 300% modulus, p.s.i | 2,075 | 2,125 |
| Tensile, p.s.i | 3,475 | 3,825 |
| Elongation, percent | 460 | 480 |
| Cured 45 minutes at 280° F., forced vibrator at 100° C.: | | |
| Dynamic modulus, p.s.i | 212 | 198 |
| Internal friction, kilopoises | 2.4 | 2.8 |
| Ring tensile at 212° F.: | | |
| Tensile, p.s.i | 1,750 | 2,125 |
| Elongation, percent | 330 | 480 |
| Firestone Flexometer: | | |
| Running temperature, ° F | 204 | 226 |
| Blowout time, minutes | 45 | 25 |

The above compounds were each built into an 8.00–15 tire of standard construction as the tread thereof. The tires were mounted and run on a test fleet car at high speeds. Assigning an arbitrary par wear value of 100 to the tire having the Hevea rubber tread, the tire having the synthetic polyisoprene rubber tread in accordance with the invention exhibited after 12,00 miles a wear rating of 95. The Hevea tread after 12,00 miles was badly cracked whereas the synthetic polyisoprene in accordance with the invention exhibited no tread cracking. Resistance of the synthetic polyisoprene rubber of the invention to flex-cracking is thus outstanding.

EXAMPLE 8

Reagent grade petroleum ether was washed with concentrated sulfuric acid until colorless; thereafter washed with water; and thereafter dried over anhydrous magnesium sulfate. Two samples 8a and 8b were charged into 28 ounce glass bottles according to the following recipes and including the purified petroleum ether:

|  | Parts by weight | |
| --- | --- | --- |
|  | Sample 8a | Sample 8b |
| Isoprene [1] | 170.00 | 170.00 |
| Petroleum ether | 0.00 | 100.00 |
| Lithium, as 35% dispersion | 0.73 | 0.73 |

[1] Supplied by Enjay Company and purified as described above to purity of about 95 mol percent.

In charging the above bottles, the bottles were swept out with an inert gas prior to loading. After charging, the bottles were sealed and subjected to a temperature of 50° C. until polymerization was complete. The polymers were separated from solvent, were washed on a laboratory wash mill to remove alkali, and antioxidant (3% based on the weight of the polymer) was added to the polymer on the mill. The washed polymers were dried at 52° C. in a vacuum oven. Percent gel, inherent viscosity and infrared structure determinations were made on the two polymers and a typical good grade of Hevea and were as follows:

|  | Sample 8a | Sample 8b | Hevea |
| --- | --- | --- | --- |
| Gel, percent | 52.70 | 9.80 | 26.3 |
| Inherent viscosity | 3.28 | 3.42 | 8–9 |
| Structure indicated by infra-red technique: |  |  |  |
| Percent cis-1,4 | 91.6 | 92.5 | 97.8 |
| Percent trans-1,4 | 0.0 | 0.0 | 0.0 |
| Percent 1,2 | 0.0 | 0.0 | 0.0 |
| Percent 3,4 | 7.9 | 7.2 | 2.2 |

Referring to the above results, it is seen that both of the polymers obtained had microstructures quite similar to Hevea. Sample 8b, however, produced in the presence of an organic solvent contained considerably less gel than either Hevea or the bulk polymer (Sample 8a) produced without the organic solvent.

Gun stocks were produced by compounding each of the above three polymers (including Hevea) in the following formula (in each instance, the same compounding ingredients and the same amounts thereof were used).

|  | Parts by weight |
| --- | --- |
| Polymer | 100.0 |
| Zinc oxide | 3.0 |
| Zinc oxide | 3.0 |
| Stearic acid | 3.0 |
| Softener | 3.0 |
| Curing agent | 3.0 |
| Accelerator | 1.2 |
| Antioxidant | 10. |

The following physical test data were obtained:

|  | Sample 8a | Sample 8b | Hevea |
| --- | --- | --- | --- |
| Cures at 280° F.: |  |  |  |
| 600% modulus (p.s.i.): |  |  |  |
| 30 minutes | 200 | 100 | 300 |
| 45 minutes | 125 | 200 | 300 |
| 60 minutes | 200 | 150 | 275 |
| 90 minutes | 175 | 150 | 300 |
| Tensile at break (p.s.i.): |  |  |  |
| 30 minutes | 1,075 | 2,450 | 1,650 |
| 45 minutes | 1,350 | 2,800 | 1,575 |
| 60 minutes | 1,175 | 2,425 | 1,925 |
| 90 minutes | 1,175 | 2,450 | 1,875 |
| Elongation, percent: |  |  |  |
| 30 minutes | 950 | 1,030 | 800 |
| 45 minutes | 940 | 1,020 | 780 |
| 60 minutes | 920 | 1,010 | 810 |
| 90 minutes | 910 | 980 | 800 |
| Williams plasticity: |  |  |  |
| $y^3$ (212° F.) (polymer) | 5.6 | 5.5 | 4.1 |
| Recovery | 1.2 | 0.9 | 0.6 |
| $y^3$ (212° F.) (stock) | 2.3 | 2.5 | 1.6 |
| Recovery | 0.1 | 0.1 | 0.0 |

Referring to the above data is seen that the gum tensile for Sample 8b is considerably higher than the gum tensile for Sample 8a.

EXAMPLE 9

When one uses an isoprene of greater purity, higher molecular weight synthetic polyisoprenes are obtained as previously pointed out. As an illustration of this, Pure Grade isoprene [10] was used in the following polymerization. Two samples (9a and 9b) were charged into 28 ounce glass bottles according to the following recipe:

|  | Parts by weight | |
| --- | --- | --- |
|  | Sample 9a | Sample 9b |
| Isoprene (99 mole percent purity) | 50.00 | 50.00 |
| Petroleum ether, reagent grade | 0.00 | 200.00 |
| Lithium, as 35% dispersion | 0.15 | 0.15 |

Polymerization of Sample 9a was carried out at 50° C. until completion. Polymerization of Sample 9b was carried out at 30° C. By infra-red analysis, percent gel, inherent viscosity and microstructure were determined for these two polymers and were as follows:

|  | Sample 9a | Sample 9b |
| --- | --- | --- |
| Gel, percent | 23.80 | 1.30 |
| Inherent viscosity | 4.55 | 11.13 |
| Structure indicated by infra-red technique: |  |  |
| Percent cis-1,4 | 93.0 | 94.3 |
| Percent trans-1,4 | 0.0 | 0.0 |
| Percent 1,2 | 0.0 | 0.2 |
| Percent 3,4 | 6.7 | 5.5 |

Referring to the data presented in Examples 8 and 9 it is apparent that the polyisoprenes prepared in the presence of an organic solvent are characterized by an inherent viscosity and corresponding molecular weight much higher than the polymers prepared by bulk polymerization. Additionally, it is seen that polymers polymerized in the solvent medium contained essentially no gel, whereas the bulk polymerized polymers contain substantial amounts of gel.

EXAMPLE 10

As an illustration of a larger scale preparation of polymer in accordance with the invention, a pilot plant polymerization of the following recipe was carried out in a 50-gallon reactor:

|  | Parts by weight |
| --- | --- |
| Isoprene [11] | 100.00 |
| Petroleum ether, reagent grade | 300.00 |
| Lithium, as 35% dispersion | 0.13 |

[11] Pure grade supplied by Phillips Petroleum Company.

The polymerization was carried out at about 85° F. to 100° F. Upon completion of the polymerization, the poly-

[10] Supplied by Phillips Petroleum Company.

mer was removed from the reactor and soaked in isopropanol to remove the solvent. After soaking, the polymer was washed on a mill with cold water and at the end of the washing 3% of an antioxidant was added to the polymer. The polymer was then dried in a vacuum oven at 50° C. The inherent viscosity of the resulting polymer was 10.7. The polymer and a typical high grade Hevea rubber were each compounded according to the following formula:

| | Parts by weight |
|---|---|
| Polymer | 100.0 |
| Zinc oxide | 3.0 |
| Stearic acid | 2.6 |
| Softener | 3.0 |
| Carbon black | 50.0 |
| Sulfur | 2.6 |
| Accelerator | 0.75 |
| Antioxidant | 1.6 |

The physical properties of these two compounds were:

| | Hevea | Polyisoprene |
|---|---|---|
| Cured 60 minutes at 280° F.: | | |
| 300% Modulus, p.s.i. | 2,125 | 1,750 |
| Tensile, p.s.i. | 3,825 | 3,550 |
| Elongation, percent | 480 | 540 |
| Cured 45 minutes at 280° F., forced vibrator at 100° C.: | | |
| Dynamic modulus, p.s.i. | 198 | 200 |
| Internal friction, kilopoises | 2.8 | 2.5 |
| Ring Tensile at 212° F.: | | |
| Tensile, p.s.i. | 2,125 | 1,875 |
| Elongation, percent | 480 | 450 |
| Firestone Flexometer: | | |
| Running temperature, ° F. | 226 | 224 |
| Blowout time, minutes | 25 | 31 |

The above compounds were each built into an 8:00-15 tire of standard construction as the tread thereof. The tires were mounted and run on a test fleet car at high speeds. Assigning an arbitrary par wear value of 100 to the tire having the Hevea rubber tread, the tire having the synthetic polyisoprene rubber tread in accordance with the invention exhibited after 12,000 miles, a wear rating of 92. The Hevea tread after 12,000 miles was badly cracked whereas the synthetic polyisoprene tread in accordance with the invention exhibited only slight tread cracking. Resistance of the polyisoprene rubber to flex-cracking is outstanding.

EXAMPLE 11

Three bottles were loaded according to the previously outlined technique with 100 parts isoprene, 0.15 part of metallic lithium (as a 35% dispersion in petrolatum) and varying amounts of triphenylmethane as shown in the following table. Polymerization was effected in each of the bottles by subjecting the contents to a temperature of 50° C. Upon completion of polymerization, the polymer was removed from each of the bottles and inherent viscosity and percentage of gel content were determined on each of the polymers. The results of these determinations are also shown in the following table.

| | Triphenyl-methane | Percent gel | Inherent viscosity |
|---|---|---|---|
| Sample No.: | | | |
| 1 | 0.0 | 29.8 | 4.02 |
| 2 | 1.0 | 1.0 | 4.48 |
| 3 | 1.0 | 2.5 | 4.17 |

Referring to the above results it is seen that Sample 1, which was polymerized in the absence of triphenylmethane contained a substantial amount of gel whereas Samples Nos. 2 and 3, polymerized in the presence of triphenylmethane, contained very little gel.

EXAMPLE 12

(A) Preparation of catalyst

Lithium dispersion (35% dispersion in white petrolactum)—19.8 grams
Pentane—500 ml.
1-Chloropentane—53.2 grams
Isopropyl alcohol—6 grams
Propylene gas.

The apparatus used for the preparation comprised a one-liter three-necked flask having a high speed stirrer, a dropping funnel and a reflux condenser on the respective three necks. The stirrer was provided with an outlet for introducing helium into the interior of the flask. The apparatus was flamed and flushed with helium for 30 minutes before charging. A constant small stream of helium was continuously passed into the reactor during the manipulations described hereafter.

The lithium dispersion and pentane were charged into the apparatus and stirring at 5000 r.p.m. commenced. The 1-chloro-pentane was added dropwise through the funnel over a period of one and one-half hours, the charge being initially at 18–28° C. but being lowered to about −5° C. after about 10 minutes (which were required to initiate the reaction) and kept at this level for the balance of the time. The isopropyl alcohol was then added dropwise over a period of two hours at a temperature of initially −6° C. which temperature was allowed to rise to 18° C. over the course of the reaction. After the addition of the isopropyl alcohol, propylene gas was introduced below the surface of the reaction mixture over a period of about three hours, the temperature being maintained at about 22° C. The reaction mixture was then blown out of the vessel by helium into a storage bottle which had previously been baked and flushed with helium.

(B) POLYMERIZATION

Isoprene (99 mole percent purity)—50 grams
n-Pentane—150 grams
Catalyst (prepared as described above)—1 ml.

The above ingredients were charged into a 28-ounce beverage bottle which had previously been flushed with helium, and the bottle capped. The sealed bottle was tumbled in a water bath at 30° C. for 48 hours. At the end of this time the bottle was cut open and the polymer precipitated by adding an isopropanol solution containing a small amount of an amine-type antioxidant, and washed with water on a roll mill. The inherent viscosity of the resultant polymer was 7.54, the gel content was 4.0% and by infra-red analysis the polymer contained 93.6% cis-1,4-; 0.0% trans-1,4-; 0.0% 1,2-; and 6.4% 3,4-unsaturation. The total unsaturation found was 92.2%.

EXAMPLE 13

Amyl lithium catalyst (A) PREPARATION OF CATALYST

Lithium metal dispersion (35% dispersion in white petrolactum)—17.5 grams
Pentane—500 ml.
1-chloropentane—47.3 grams The same apparatus was used in this experiment as in Example 12. The pentane and lithium metal dispersion were charged into the apparatus, which had been purged with helium, and stirring at 5000 r.p.m. commenced and continued throughout the reaction to follow. The 1-chloropentane was added dropwise through the funnel over a period of two hours at temperatures which rose from −10° C. at the beginning of the reaction to 28° C. at the completion of the reaction. The product was a dark purple homogeneous liquid. The reaction mixture was then pressured into a helium-flushed bottle for storage.

(B) POLYMERIZATION

Isoprene (99 mole percent purity)—100 grams
n-Pentane—300 grams
Catalyst (prepared as just described)—1 ml. (0.01 g. lithium)

The isoprene and pentane were mixed and passed through a column of activated silica gel which had previously been washed with purified petroleum ether. The mixture was charged into a 28-ounce beverage bottle which had previously been flushed with argon. After venting and before capping, the catalyst was added. The bottle was then capped with an aluminum foil lined crown cap, shaken briefly to mix the ingredients and allowed to stand uprigth at 25° C. for 18 hours. The mixture became warm and thickened while standing, the main portion of the reaction being completed within six hours. After the completion of the 18 hour period of standing, the bottle was cut open to remove the jelly of polymerized material and solvent. The jelly was mixed with a 2% solution of mercaptobenzimidazole in isopropyl alcohol, which caused the polymer to separate as a coagulum from the pentane solvent. The coagulum mass was removed from the solvent and washed on a roll mill, an additional 3% of mercaptobenzimidazole being added on the mill as antioxidant. The polymer sheeted out nicely on the mill and was dried at 50° C. in a vacuum oven for 18 hours. The polymer had an inherent viscosity of 4.11 and contained no gel. Infra-red analysis indicated it to contain 82.6% cis-1,4-; 9.2% trans-1,4-; 8.2% 3,4-; and the total unsaturation found was 98.6%.

(C) COMPOUNDING AND VULCANIZATION

|  | Parts |
|---|---|
| Polymer (produced as just described) | 100 |
| Carbon black | 50 |
| Zinc oxide | 3 |
| Lubricant | 26 |
| Sofening agent | 3.0 |
| Sulfur | 2.5 |
| Accelerators | 0.5 |
| Retarder | 1.0 |

The above ingredients were milled together and vulcanized into test specimens at 280° F. for 60 minutes. The vulcanizate had the following properties:

Tensile strength—2275 pounds per sq. in.
Modulus of elasticity—1975 pounds per sq. in.
Elongation—340%
Internal friction—2.0

EXAMPLE 14

Pentamethylene dilithium catalyst

(A) PREPARATION OF CATALYST

Lithium dispersion (35% dispenrsion in white petrolactum)—19.8 grams (1.0 gram atom)
Diethyl ether—500 ml.
Pentamethylene dichloride—35.2 grams (0.25 mole)

The apparatus used for the preparation comprised a one-liter three-necked flask having a high-speed stirrer, a dropping funnel, and a reflux condenser on the respective three necks. The stirrer was provided with an inlet for introducing helium into the interior of the flask. The apparatus was flamed and flushed with helium for 30 minutes before charging. A constant small stream of helium was continuously passed into the reactor during the manipulations described hereafter.

The lithium dispersion and ether ware charged into the flask, and stirring was commenced and maintained throughout the procedure to follow. The pentamethylene dichloride was added dropwise through the funnel over a period of three and one-half hours, the temperature of the batch being adjusted in accordance with the following schedule:

| Time since start (min.) | 0 | 5 | 10 | 25–210 |
|---|---|---|---|---|
| Temperature (° C.) | 20 | 0 | −5 | 20–25 |

The reaction mixture was then transferred by helium pressure into a one-liter distilling apparatus in which the ether was distilled off while n-heptane was simultaneously added dropwise. The ether was ditsilled off down to a pot temperature of 25° C. at 150 mm., which conditions were maintained until 250 ml. of n-heptane was also distilled to scavenge out the last traces of ether. The residue was then pressured by helium over into a storage bottle, and the volume made up to 800 ml. by addition of n-heptane so that the solution contained .0087 gram of lithium per ml.

(B) POLYMERIZATION

|  | Grams |
|---|---|
| Isoprene (99 mole percent purity) | 100 |
| n-Pentane | 200 |
| Pentamethylene dillithium catalyst (prepared as just described) | [1] 0.026 |

[1] As lithium.

The above ingredients were charged into a 28-ounce beverage bottle previously flushed with argon, and the bottle sealed and tumbled in a water bath at 50° C. for 16 hours. At the end of this time the bottle was cooled and opened, and the polymer coagulated from the solution by the addition of isopropanol. The coagulated polymer was washed on a washing mill, 3% of an amine-type antioxidant was added to the polymer on the mill, and the milled polymer was dried under vacuum at 50° C. The resultant polymer had an inherent viscosity of 18.9 and zero gel content. By way of comparison, an otherwise similar run using amyl lithium as a catalyst resulted in a polymer having an inherent viscosity of 4.1. Infrared examination of the present polymer showed 92.3% cis-1,4-; and 7.7% 3,4-unsaturation, the total unsaturation found being 88.3%.

(C) COMPOUNDING AND VULCANIZATE PROPERTIES

The above procedure was repeated a number of times in order to provide sufficient material for tests. The polymer was compounded, vulcanized and tested, in parallel with Hevea rubber in accordance with the formulation set out in the following table, both compounds being vulcanized at 280° F. for one hour. The slight compounding differences between the two stocks represent adjustments made to secure optimum performance in each case.

|  | Hevea stock parts | Polyisoprene stock parts |
|---|---|---|
| Ingredients: |  |  |
| Hevea rubber | 100 |  |
| Polyisoprene (prepared as above described) |  | 100 |
| Carbon black | 50 | 50 |
| Zinc oxide | 3 | 3 |
| Stearic acid | 2.6 | 2.6 |
| Softener | 3.0 | 3.0 |
| Antioxidant | 2.5 | 1.6 |
| Accelerator | .5 | .75 |
| Retarder | 1.0 | 1.0 |
| Sulfur | 2.6 | 2.5 |

|  | As cured | Aged 2 days at 212° F. | As cured | Aged 2 days at 212° F |
|---|---|---|---|---|
| Properties: |  |  |  |  |
| 300% modulus (lbs./sq. in.) | 1,700 |  | 1,500 | 2,150 |
| Tensile strength (lbs./sq. in.) | 3,600 | 1,500 | 3,325 | 2,600 |
| Elongation, percent | 540 | 290 | 560 | 380 |
| Internal friction | 2.6 |  | 2.4 |  |
| Running temperature °F. | 245 |  | 250 |  |
| Blowout time (min.) | 15 |  | 20 |  |
| Ring tensile strength (lbs./sq. in.): |  |  |  |  |
| At 212° F | 2,025 |  | 1,850 |  |
| At 275° F | 1,400 |  | 1,200 |  |
| Tear strength: |  |  |  |  |
| At 212° F | 568 |  | 350 |  |
| At 275° F | 448 |  | 276 |  |

EXAMPLE 15

Mixed lithium metal and organodilithium catalysts

| | Grams |
|---|---|
| Isoprene (99 mole percent purity) | 100 |
| n-Pentane | 300 |
| Lithium dispersion (35% dispersion in white petrolatum) | .44 |
| Pentamethylene dilithium catalyst (prepared as described in Example 14) | [1] 0.0043 |

[1] As lithium.

The isoprene and n-pentane were charged into a 28-ounce beverage bottle, and a small portion of the charge evaporated to purge the vessel. The lithium dispersion and pentamethylene dilithium catalyst were charged and the bottle sealed and placed on a polymerizer wheel at 50° C. for 24 hours. The polymer was coagulated and worked up as described in Example 14. Infra-red data established that the polymer contained 94.7% cis-1,4-; 0.2% 1,2-; and 5.1% 3,4-unsaturation, the total found being 87.9%.

EXAMPLE 16

(A) Preparation of catalyst

Aluminum trichloride—1 gram
Lithium dispersion (35% dispersion of lithium in Vaseline)—2.45 grams
Petroleum ether—100 ml.

The above ingredients were charged into a flask previously purged with helium and provided with an agitator. The ingredients were agitated together at 25° C. for 15 hours.

(B) Polymerization

Isoprene (99 mole percent purity)—30 grams
Catalyst suspension (prepared as above described)—1 ml.
Pentane—90 grams The above ingredients were charged into a six-ounce polymerization bottle which had previously been flamed and purged with helium. The bottle contained a magnetic stirring bar. The bottle was capped, magnetic stirring commenced, and the temperature raised to 55° C. At the end of three hours, polymerization had set in, whereupon the temperature was dropped to 20° C. and stirring continued as long as this was possible. At the end of 18 hours since the beginning of the operation, the bottle was cut open and the polyisoprene solution was precipitated by adding isopropanol containing 2% of mercaptobenzimidazole (to protect against oxidation). The coagulum was then washed free of isopropanol on a wash mill and dried in a vacuum oven at 50° C. for 18 hours.

The resultant polymer on infra-red analysis showed 93.9% cis-1,4-; 0.7% trans-1,4-; 0.0% 1,2-; and 5.3% 3,4-addition, the total unsaturation found being 92.6%. An X-ray fiber diagram similar to that of Hevea rubber was obtained from stretched samples of the uncured polyisoprene, and also from vulcanizates thereof. When soaked in an ethanol-toluene-water solution of silver nitrate for 24 hours, the polymer formed a complex which gave an X-ray diffraction diagram similar to that of a similarly treated specimen of Hevea rubber.

(C) Compounding and vulcanization

| | Parts |
|---|---|
| Polyisoprene (prepared as just described) or pale crepe Hevea rubber | 100 |
| Antioxidant | 1 |
| Stearic acid | 4 |
| Zinc oxide | 6 |
| Sulfur | 3 |
| Mercaptobenzothiazole | 0.5 |

Two compositions were made up in accordance with the above schedule, using the polyisoprene in one composition and pale crepe in the other. Specimens were cured at 260° F. for periods of 30, 45 and 60 minutes. Set forth herewith are the properties of the vulcanizates.

| | Hevea | Polyisoprene |
|---|---|---|
| 600% modulus (pounds per sq. in.): | | |
| Cured 30 min | 500 | 325 |
| Cured 45 min | 1,150 | 800 |
| Cured 60 min | 1,375 | 825 |
| Tensile strength (pounds per sq. in.): | | |
| Cured 30 min | 2,125 | 2,800 |
| Cured 45 min | 2,825 | 3,000 |
| Cured 60 min | 3,575 | 3,175 |
| Elongation at break (5): | | |
| Cured 30 min | 810 | 850 |
| Cured 45 min | 760 | 780 |
| Cured 60 min | 760 | 760 |

The polyisoprene compound of this example was molded into an atomizer and vulcanized at 260° F. for 60 minutes. The resultant bulb was attached to an atomizer and gave excellent service.

EXAMPLE 17

A number of runs were made, using the procedure of Example 16, and employing aluminum chloride and other substances which form complexes when reacted with lithium, and varying the proportions of these ingredients, as set forth in the following table:

TABLE II

| Catalyst ingredients [1] | | | | Polymerization temperature, ° C. | | Proportions of structures found by infra-red analysis (percentages) | | | | |
|---|---|---|---|---|---|---|---|---|---|---|
| Lithium (grams) | Material reacted with lithium | Grams | Isoprene used (grams) | Pentane used (grams) | At outset | After polymerization began | Cis-1,4- | Trans-1,4- | 1,2- | 3,4- | Total unsaturation found |
| 0.085 | AlCl³ | 2.6 | 100 | 300 | 55 | 55 | 93.1 | 0 | 0 | 6.9 | 90.6 |
| 0.56 | AlCl³ | 2.6 | 100 | 300 | 55 | 25 | 93.2 | 0 | 0.2 | 6.6 | 89.2 |
| 0.35 | TiCl⁴ | 1.73 | 100 | 100 | 60 | 60 | 92.9 | 0 | 0 | 7 | 90.9 |
| 0.06 | {Aluminum powder [2] / Silicon carbide} | 0.023 / 0.035 | 100 | 300 | 50 | 35 | 94.3 | 0 | 0 | 5.6 | 91.5 |
| 0.15 | Aluminum powder [2] | 0.25 | 100 | 300 | 70 | 70 | 88.3 | 2.1 | 0.2 | 9.4 | 99.9 |
| 0.15 | Zinc powder [2] | 0.35 | 100 | 300 | 70 | 70 | 90.0 | 0.0 | 0.2 | 9.9 | 97.8 |
| 0.15 | Iron powder [2] | 0.35 | 100 | 300 | 70 | 70 | 90.5 | 0.0 | 0.2 | 9.3 | 97.8 |

[1] These figures relate to the amounts of the ingredients actually entering the polymerization vessel. The catalysts were prepared on a moderately large scale from larger quantities of starting materials, and the catalyst used and recorded in the table is an aliquot portion of the large-scale preparation.
[2] The action of these catalysts appears to be due to the action of the lithium upon the oxide coating on the metal powders. Also the oxide coating itself appears to exert some directive influence upon the polymerizing mixture.

EXAMPLE 18

*Lithium naphthalenide-titanium tetrachloride complex catalyst*

(A) PREPARATION OF LITHIUM NAPHTHALENIDE

Diethyl ether—100 ml.
Naphthalene—12 grams
Lithium dispersion—2 grams

The above ingredients were agitated together under a blanket of helium for 72 hours at 25° C. The mass was then subjected to distillation under a pressure of 15–20 mm. absolute pressure, n-heptane being continuously added to the mass so as to replace the diethyl ether with n-heptane. The mass was then transferred to a storage bottle. Titration indicated that the mass was 0.56 molar in lithium.

(B) POLYMERIZATION

| | Ml. |
|---|---|
| Petroleum ether | 225 |
| Isoprene (99 mole percent purity) | 75 |
| Lithium naphthalenide dispersion (prepared as just described) | 6 |
| Titanium tetrachloride solution (1 molar) | 1 |

The foregoing recipe provides a ratio of Li/TiCl$_4$=3.36. The ingredients were charged into a 28-ounce beverage bottle provided with a magnetic stirring bar, and the bottle was flushed with helium and sealed. The bottle was then placed for 18 hours in a water bath maintained at 55° C. and provided with a magnetic stirrer. The resultant solution of polymer was treated to recover the polymer as in the preceding examples. Infra-red analysis indicated that the polymer contained 91.8% cis-1,4-; 0.0% 1,2-; and 5.7% 3,4-addition, the total unsaturation found being 94.4%.

EXAMPLE 19
Catalyst on a carrier
(A) PREPARATION OF CATALYST

Finely divided silica ("Cabosil" a product of Godfrey L. Cabot, Inc.; having a surface area of 175–200 square meters per gram)—15 grams
Aluminum trichloride—3.0 grams
Petroleum ether:
  First portion—150 ml.
  Second portion—25 ml.
Lithium dispersion (35% dispersion in petrolatum:
  First portion—2.02 grams
  Second portion—.70 gram A flask having a stirrer and a connection for continuously flushing the free space therein with helium was provided for this preparation. The silica, aluminum trichloride and first portion of petroleum ether were charged and agitated together for 1 hour. The first portion of lithium dispersion was then added and stirring continued for 1 hour. The second portions of lithium dispersion and of petroleum ether were added next, and agitation continued for a further hour. The entire mass was then pressured over into a storage bottle and diluted with petroleum ether to a total volume of 380 ml.

(B) POLYMERIZATION

Isoprene (99 mole percent purity)—75 grams
Petroleum ether—225 parts
Catalyst (prepared as just described)—1.0 ml.

The above ingredients were charged and sealed into a 32-ounce beverage bottle, previously flushed with helium and provided with a stirring bar. The bottle was then placed in a bath at 55° C. on a magnetic stirrer for 3 days. The bottle was then cut open and the polymer recovered by dropping the solution into isopropanol, followed by washing with water on a wash mill with addition of an antioxidant.

EXAMPLE 20

| | Parts |
|---|---|
| Isoprene (99 mole percent purity) | 100 |
| Petroleum ether | 300 |
| Sodium fluoborate | 1.1 |
| Lithium dispersion (dispersion in petrolatum contains 35% lithium) | 0.06 |

The sodium fluoborate, lithium dispersion and petroleum ether were charged into a tumbling reactor which had previously been purged with helium. The ingredients were then tumbled at 25° C. for 24 hours, at the ned of which time the lithium appeared to have been entirely taken up as a complex with the sodium fluoborate, since no lithium could be observed floating upon the liquid, and the liquid itself exhibited nacreous streaming lines when agitated. The isoprene was then pressured in, the temperature adjusted to 50° C., and tumbling continued for an additional 18 hours. At the end of this time, the reaction mixture was discharged from the vessel and the polymer precipitated therefrom by stirring with isopropanol containing 2% of an antioxidant. The polymer was washed with water on a wash mill, and dried in a vacuum oven. The polymer had an inherent viscosity of 12.0, with a gel content of 5.5%. Infra-red analysis established that the polymer contained 94.4% cis-1,4-; 0.0% trans-1,4-; 1,2-; and 5.6% 3,4-unsaturation; the total unsaturation found being 93.5%.

The polymer prepared as just described was compounded in accordance with a conventional tire tread formulation, extruded as a tread and built into a tire of otherwise conventional components. The tire was cured in a conventional cycle, and gave excellent service on the road.

EXAMPLE 21

| | Grams |
|---|---|
| Isoprene (99 mole percent purity) | 50 |
| Petroleum ether | 52.5 |
| Calcium fluoride | 0.78 |
| Lithium paste (35% dispersion in petrolatum) | 0.37 |

The calcium fluoride, lithium paste and 100 grams of the petroleum ether were charged and sealed into a 6-ounce beverage bottle which had previously been flamed and which was flushed with helium before and during the charging. The bottle contained a magnetic stirring bar and was placed on a magnetic stirrer for 18 hours. The bottle was then opened, the isoprene and balance of the petroleum ether charged while flushing with helium, and the bottle resealed. Magnetic stirring was resumed and continued for a further 24 hours. The bottle was then cut open and the contents stirred into a body of isopropanol, containing an antioxidant, to precipitate the polymer. The polymer was washed with water on a wash mill and dried in a vacuum oven. The product had an inherent viscosity of 12.3 and contained 0.5% gel. Infra-red analysis showed 92.0% cis-1,4-; 0.0% 1,2-; 7.9% 3,4-; and 0.0% trans-1,4-unsaturation, 90.2% being the total unsaturation found.

EXAMPLE 22

The following polymerization recipe was introduced into a polymerization vessel:

| | Parts by weight |
|---|---|
| Isoprene (99 mole percent purity) | 100 |
| Petroleum ether | 220 |
| Magnesium diethyl (as a 0.64 molar solution in n-heptane) | 1.27 |
| Titanium tetrachloride (as a 10% solution in n-heptane) | 2.58 |

The petroleum ether was introduced first into the polymerization reactor and a portion thereof allowed to vent at 55° C. The magnesium diethyl was then added to the vessel followed by addition of the titanium tetrachloride and the isoprene. The vessel was closed and polymerization was allowed to proceed at 55° C. The molar ratio of the magnesium diethyl to the titanium tetrachloride was 1.14. After polymerization, the polymer was recovered and found to contain by infra-red analysis 81.3% cis-1,4-; 14.3% trans-1,4-; no 1,2- and 4.3% 3,4-addition products. The total unsaturation found was 92.1%.

EXAMPLE 23

Three bottles (hereafter referred to as A, B and C) were each charged according to the following recipe:

| | Parts by weight | | |
|---|---|---|---|
| | A | B | C |
| Petroleum ether | 2220.00 | 220.000 | 200.02 |
| Isoprene (99 mole percent purity) | 100.00 | 100.000 | 100.00 |
| Aluminum triethyl (as a 10% solution in n-heptane) | 0.062 | 0.226 | 0.60 |
| Titanium tetrachloride (as a 10% solution in n-heptane) | 0.520 | 0.520 | 1.04 |

Petroleum ether was in each instance introduced first and vented according to the technique previously discussed. In this case, however, the aluminum triethyl was added to each of the bottles followed by the titanium tetrachloride and finally by the isoprene. The bottles were then capped. The mole ratios of aluminum triethyl to titanium tetrachloride in the charges to bottles A, B and C were respectively 0.2, 0.73 and 0.97. The samples were reacted at 50° C. overnight. A resinous polymer amounting to approximately 5% of the theoretical was obtained in bottle A. A rubbery polymer amounting to about 72% of the theoretical was obtained in bottle B. A rubbery polymer amounting to about 77% of the theoretical was obtained in bottle C. Infra-red analyses of these polymers were obtained and were as follows:

| Bottle | Cis-1,4- | Trans-1,4- | 1,2- | 3,4- | Total unsaturation found (percent) |
|---|---|---|---|---|---|
| A | 42.0 | 52.5 | 1.7 | 3.8 | 74.9 |
| B | 88.2 | 7.8 | 0.0 | 3.1 | 103.0 |
| C | 93.5 | 1.5 | 0.1 | 4.9 | 87.8 |

Referring to the above data, it is noted that increasing the molar ratio of aluminum triethyl to titanium tetrachloride from 0.2 to the neighborhood of about 0.7 changes the characteristics of the polymers obtained quite markedly from polymers of a resinous nature to polymers of a rubbery nature.

EXAMPLE 24

To each of five bottles (referred to hereafter as A, B, C, D and E) were added 300 parts by weight of petroleum ether and 100 parts by weight of isoprene having a purity of 99 mole percent. The petroleum ether was added first and heated to boiling whereupon the isoprene was introduced. Aluminum triethyl (as a 1 molar solution in n-heptane) was introduced into each of the bottles in the amounts indicated below. Each of the bottles was then capped and cooled to −10° C. and titanium tetrachloride (as a 1 molar solution in n-heptane) was then injected into the various bottles in the amounts indicated hereafter. Polymerization was effected in each case at −10° C. and the yield expressed as percentage of theoretical is also set forth hereafter.

| Bottle | Sample numbers | | | | |
|---|---|---|---|---|---|
| | A | B | C | D | E |
| Aluminum triethyl (parts by weight) | 2.28 | 2.05 | 2.39 | 2.28 | 2.05 |
| Titanium tetrachloride (parts by weight) | 3.80 | 2.85 | 2.85 | 2.38 | 1.90 |
| Ratio of aluminum triethyl:titanium tetrachloride | 1.0 | 1.2 | 1.4 | 1.6 | 1.8 |
| Yield, percent | 95.0 | 100.0 | 68.0 | 41.0 | 10.0 |
| Gel, percent | 30.5 | 10.0 | 8.0 | 2.5 | 3.5 |
| Inherent viscosity | 0.66 | 2.8 | 2.08 | 1.93 | 1.9 |

Analysis by the described infra-red technique showed the structure of these polymers to be as follows:

| Sample | Cis-1,4- | Trans-1,4- | 1,2- | 3,4- | Total unsaturation found (percent) |
|---|---|---|---|---|---|
| A | 95.2 | 0.7 | 0.0 | 4.0 | 90.0 |
| B | 96.1 | 0.0 | 0.0 | 3.9 | 88.0 |
| C | 96.3 | 0.0 | 0.0 | 3.7 | 91.8 |
| D | 95.8 | 0.0 | 0.0 | 4.2 | 85.4 |
| E | 95.8 | 0.0 | 0.0 | 4.2 | 85.8 |

Referring to the above data, it is seen that excellent polymers are produced from isoprene by the use of catalyst in accordance with the invention wherein the ratio of aluminum triethyl to titanium tetrachloride is varied from 1 through 1.8. Within this range of ratios very little variation in the microstructure occurs. Toward the upper part of the range of ratios, however, it will be noted that the percent unsaturation tends to fall off.

EXAMPLE 25

The following formulations were polymerized in bottles:

| Bottle | A | B | C | D |
|---|---|---|---|---|
| Petroleum ether | 300.00 | 300.00 | 300.00 | 300.00 |
| Isoprene (99 mole percent purity) | 100.00 | 100.00 | 100.00 | 100.00 |
| Aluminum triisobutyl [1] | 2.98 | 3.57 | 2.57 | 4.15 |
| Titanium tetrachloride [1] | 3.56 | 3.42 | 2.85 | 2.85 |

[1] As a 1 molar solution in n-heptane.

In each of the above bottles the petroleum ether was charged first and vented followed by addition of next the aluminum triisobutyl and then the titanium tetrachloride. All of the bottles were then capped and cooled to −30° C. and the isoprene was thereafter injected. The molar ratio of aluminum triisobutyl to titanium tetrachloride was 0.8 in the charge of bottle A, 1.0 in bottle B, 1.2 in bottle C and 1.4 in bottle D. Polymerization of all the charges was carried out at −30° C. The yield in bottle A was 8%, in bottle B was 22.5%, in bottle C was 65% and in bottle D was 72%. The gel content in bottle A was 18.5%, in bottle B was 15.8%, in bottle C was 16.3% and in bottle D was 10.5%. The inherent viscosity of the charge in bottle A was 0.13, in bottle B was 0.55, in bottle C was 5.12 and in bottle D was 4.7. The infra-red analysis of the various polymers was as follows:

| Sample | Cis-1,4- | Trans-1,4- | 1,2- | 3,4- | Total unsaturation found (percent) |
|---|---|---|---|---|---|
| A | 43.6 | 50.8 | 2.0 | 3.6 | 87.4 |
| B | 55.8 | 38.6 | 1.6 | 4.1 | 83.2 |
| C | 96.5 | 0.0 | 0.0 | 3.5 | 88.8 |
| D | 96.6 | 0.0 | 0.0 | 3.14 | 94.7 |

In the above series of polymerizations, all of which were carried out at a rather low temperature, i.e. −30° C., it is noted that somewhat higher ratios of aluminum trialkyl to titanium tetrachloride are required to produce polymers having a high cis-1,4- structure than is the case at somewhat higher polymerization temperatures.

EXAMPLE 26

The following recipe was polymerized:

Parts by weight
Silica _____ 7.34
n-Heptane _____ 500
Aluminum triethyl (as a 0.735 molar solution in n-heptane) _____ 1.34
Titanium tetrachloride (as a 1 molar solution in n-heptane) _____ 1.39
Isoprene (99 mole percent purity) _____ 100

The molar ratio of the aluminum triethyl to the titanium tetrachloride was 1.6. The silica was introduced first into a reaction vessel followed by introduction respectively of the heptane aluminum triethyl and titanium tetrachloride. During the introduction of these materials helium was bubbled through mixture to sweep out the reactor. Sweeping out of the reactor with helium was ceased; the isoprene was introduced into the reactor and the reactor closed. Polymerization was allowed to proceed at 0° C. The polymer was recovered and found to contain by infra-red analysis 96.7% cis-1,4-, no trans-1,4- and 1,2- and 3.3% 3,4-addition products. The total unsaturation found was 91.8.

In view of the foregoing general disclosure and specific exemplification, modifications within the scope of the present invention will be apparent to those skilled in the art. It is, therefore, intended that the invention be limited solely by the scope of the appended claims.

What is claimed is:

1. A synthetic homopolymer of isoprene combining the desirable properties of both Hevea and sulfur vulcanizable synthetic rubbers characterized by at least 80% cis-1,4 structure, not in excess of 10% trans-1,4 structure, not in excess of 10% 3,4 structure, and essentially no 1,2 structure, said homopolymer being free from the proteins, soaps, resins and sugars present in natural Hevea rubber.

2. A synthetic homopolymer of isoprene combining the desirable properties of both Hevea and sulfur vulcanizable synthetic rubbers characterized by at least 80% cis-1,4 structure, not in excess of 10% trans-1,4 structure, not in excess of 10% 3,4 structure, and essentially no 1,2 structure, which homopolymer exhibits an oriented crystalline X-ray diffraction pattern at an elongation of not less than about 400% at room temperature, said homopolymer being free from the proteins, soaps, resins and sugars present in natural Hevea rubber.

3. A synthetic homopolymer of isoprene combining the desirable properties of both Hevea and sulfur vulcanizable synthetic rubbers characterized by at least 80% cis-1,4 structure, not in excess of 10% trans-1,4 structure, not in excess of 10%, 3,4 structure, and essentially no 1,2 structure, said homopolymer being free from the proteins, soaps, resins and sugars present in natural Hevea rubber and when vulcanized being characterized by low hysteresis and high crack resistance.

4. A vulcanizate of a synthetic homopolymer of isoprene, said homopolymer being characterized by at least about 80% cis-1,4 structure, not in excess of 10% trans-1,4 structure, not in excess of 10% 3,4 structure, and essentially no 1,2 structure, said homopolymer being free from the proteins, soaps, resins and sugars present in natural Hevea rubber, said vulcanizate being characterized by low hysteresis properties, a crack growth resistance and a cut growth resistance at least equal to that of natural rubber vulcanizates and a crack initiation resistance equal to that of GR-S vulcanizates.

5. A vulcanizate of a synthetic homopolymer of isoprene, said homopolymer being characterized by at least about 80% cis-1,4 structure, not in excess of 10% trans-1,4 structure, not in excess of 10% 3,4 structure and essentially no 1,2 structure, which homopolymer is further characterized by the property of exhibiting an oriented crystalline X-ray diffraction pattern at an elongation of not less than about 400% at room temperature, said homopolymer being free from the proteins, soaps, resins and sugars present in natural Hevea rubber, said vulcanizate being characterized by low hysteresis properties, a crack growth resistance and a cut growth resistance at least equal to that of natural rubber vulcanizates and a crack initiation resistance equal to that of GR-S vulcanizates.

6. A synthetic homopolymer of isoprene combining the desirable properties of both Hevea and sulfur vulcanizable synthetic rubbers characterized by from about 80 to about 96% cis-1,4 structure, from 0 to about 10% trans-1,4 structure, essentially no 1,2 structure, and from 3 to about 10% 3,4 structure, said homopolymer being free from the proteins, soaps, resins and sugars present in natural Hevea rubber.

7. A synthetic homopolymer of isoprene combining the desirable properties of both Hevea and sulfur vulcanizable synthetic rubbers characterized by from about 80 to about 96% cis-1,4 structure, from 0 to about 10% trans-1,4 structure, essentially no 1,2 structure, and from 3 to about 10% 3,4 structure, which homopolymer exhibits an oriented crystalline X-ray diffraction pattern at room temperature at not less than about 400% elongation, said homopolymer being free from the proteins, soaps, resins and sugars present in natural Hevea rubber.

8. A synthetic homopolymer of isoprene combining the desirable properties of both Hevea and sulfur vulcanizable synthetic rubbers characterized by from about 80 to about 96% cis-1,4 structure, from 0 to about 10% trans-1,4 structure, essentially no 1,2 structure, and from 3 to about 10% 3,4 structure, said homopolymer being free from the proteins, soaps, resins and sugars present in natural Hevea rubber and when vulcanized being characterized by low hysteresis and high crack resistance.

9. A vulcanizate of a synthetic homopolymer of isoprene, said homopolymer being characterized by from about 80 to about 96% cis-1,4 structure, from 0 to about 10% trans-1,4 structure, essentially no 1,2 structure, and from 3 to about 10% 3,4 structure, said homopolymer being free from the proteins, soaps, resins and sugars present in natural Hevea rubber, said vulcanizate being characterized by hysteresis properties, a crack growth resistance and a cut growth resistance at least equal to that of natural rubber vulcanizates and a crack initiation resistance equal to that of GR-S vulcanizates.

10. A vulcanizate of a synthetic homopolymer of isoprene, said homopolymer being characterized by from about 80 to about 96% cis-1,4 structure, from 0 to about 10% trans-1,4 structure, essentially no 1,2 structure, and from 3 to about 10% 3,4 structure, said homopolymer being further characterized by the property of exhibiting an oriented crystalline X-ray diffraction pattern at an elongation of not less than about 400% at room temperature, said homopolymer being free from the proteins, soaps, resins and sugars present in natural Hevea rubber, said vulcanizate being characterized by hysteresis properties, a crack growth resistance and a cut growth resistance at least equal to that of natural rubber vulcanizates and a crack initiation resistance equal to that of GR-S vulcanizates.

11. A synthetic homopolymer of isoprene combining the desirable properties of both Hevea and sulfur vulcanizable synthetic rubbers characterized by from about 80 to about 96% cis-1,4 structure, essentially no trans-1,4 structure, essentially no 1,2 structure, and from 3 to about 10% 3,4 structure, said homopolymer being free from the proteins, soaps, resins and sugars present in natural Hevea rubber.

12. A synthetic homopolymer of isoprene combining the desirable properties of both Hevea and sulfur vulcanizable synthetic rubbers characterized by from about 80 to about 96% cis-1,4 structure, essentially no trans-1,4 structure, essentially no 1,2 structure, and from 3 to about 10% 3,4 structure, which homopolymer exhibits an oriented crystalline X-ray diffraction pattern at an elongation of not less than about 400% at room temperature, said homopolymer being free from the proteins, soaps, resins and sugars present in natural Hevea rubber.

13. A synthetic homopolymer of isoprene combining the desirable properties of both Hevea and sulfur vulcanizable synthetic rubbers characterized by from about 80 to about 96% cis-1,4 structure, essentially no trans-1,4 structure, essentially no 1,2 structure, and from 3 to about 10% 3,4 structure, said homopolymer being free from the proteins, soaps, resins and sugars present in natural Hevea rubber and when vulcanized being characterized by low hysteresis and high crack resistance.

14. A vulcanizate of a synthetic homopolymer of isoprene, said homopolymer being characterized by from about 80 to about 96% cis-1,4 structure, essentially no trans-1,4 structure, essentially no 1,2 structure, and from 3 to about 10% 3,4 structure, said homopolymer being free from the proteins, soaps, resins and sugars present in natural Hevea rubber, said vulcanizate being characterized by hysteresis properties, a crack growth resistance and a cut growth resistance at least equal to that of natural rubber vulcanizates and a crack initiation resistance equal to that of GR-S vulcanizates.

15. A vulcanizate of a synthetic homopolymer of isoprene, said homopolymer being characterized by from about 80 to about 96% cis-1,4 structure, essentially no trans-1,4 structure, essentially no 1,2 structure, and from 3 to about 10% 3,4 structure, said homopolymer being further characterized by the property of exhibiting an oriented crystalline X-ray diffraction pattern at an elongation of not less than about 400% at room temperature, said homopolymer being free from the proteins, soaps, resins and sugars present in natural Hevea rubber, said vulcanizate being characterized by hysteresis properties, a crack growth resistance and a cut growth resistance at least equal to that of natural rubber vulcanizates and a crack initiation resistance equal to that of GR-S vulcanizates.

16. A method which comprises polymerizing isoprene in the presence of finely divided metallic lithium in a polymerization system essentially free from foreign materials reactive with lithium, including moisture, oxygen, nitrogen, oxygen-containing organic compounds and nitrogen-containing organic compounds whereby an essentially cis solid synthetic homopolymer of isoprene capable of exhibiting an oriented crystalline X-ray diffraction pattern at an elongation of not less than about 400% at room temperature is produced.

17. A method according to claim 16 in which the polymerization is conducted at a temperature of from about 0° C. to about 100° C.

18. A method which comprises polymerizing an isoprene having a purity of at least 95 mol percent in the presence of finely divided metallic lithium in a polymerization system essentially free from foreign materials reactive with said metallic lithium including moisture, oxygen, nitrogen, oxygen-containing organic compounds and nitrogen-containing organic compounds, whereby an essentially cis solid synthetic homopolymer of isoprene is produced.

19. A method according to claim 18 in which the polymerization is conducted at a temperature of from about 0° C. to about 100° C.

References Cited

UNITED STATES PATENTS

| | | | |
|---|---|---|---|
| 1,073,116 | 9/1913 | Harries | 260—94.2 |
| 3,114,743 | 12/1963 | Horne, Jr. | 260—94.3 |
| 2,399,156 | 4/1946 | Stamberger et al. | 260—817 |
| 3,175,997 | 3/1965 | Hsieh | 260—94.7 |

OTHER REFERENCES

Ziegler: "The Polymerization of Butadiene and the Production of Artificial Rubber," Rubber Chemistry and Technology, vol. 11, 1938, pp. 501–507.

Ziegler et al.: "Justus Liebigs Annalen der Chemie," vol. 511, XII, 1934, pp. 45–63.

Davis et al.: "Chemistry and Technology of Rubber," Reinhold Publishing Corp., New York, N.Y., 1937, pp. 91–92.

JOSEPH L. SCHOFER, Primary Examiner

A. HOLLER, Assistant Examiner

U.S. Cl. X.R.

260—94.3

PO-1050
(5/69)

UNITED STATES PATENT OFFICE
CERTIFICATE OF CORRECTION

Patent No. 3,632,563       Dated January 4, 1972

Inventor(s) Lynn B. Wakefield and Frederick C. Foster

It is certified that error appears in the above-identified patent and that said Letters Patent are hereby corrected as shown below:

Col. 1, line 35, "synthsis" should read --synthesis--

Col. 1, line 64, "rolecules" should read --molecules--

Col. 1, line 72, insert --found-- after "been"

Col. 2, line 16, "syntheic" should read --synthetic--

Col. 3, line 6, "asynthetic" should read --a synthetic--

Col. 5, line 35, "thiazole" should read --thiazoline--

Col. 6, line 11, "butyldehyde" should read --butyraldehyde--

Col. 6, line 46, "catalyic" should read --catalytic--

Col. 6, line 61, insert --of-- after "polymers"

Col. 9, line 3, "litihum" should read --lithium--

Col. 9, line 19, "Heavy Metals" should read --HEAVY METALS--

Col. 10, line 5 (in third column), "$[SaCl_6]$" should read --$[SbCl_6]$--; same column 10, line 32, "$uLi + v(M_B)vX_pA_q$" should read -- $uLi + v(M_H)_o \cdot X_pA_q$ --.

Col. 11, line 3, "$[(M_H)_n \cdot X_pA_q]$" should read --$[(M_H)_o \cdot X_pA_q]$--

Col. 11, line 23, "exterts" should read --exerts--

UNITED STATES PATENT OFFICE
CERTIFICATE OF CORRECTION

Patent No. 3,632,563          Dated January 4, 1972

Inventor(s) Lynn B. Wakefield and Frederick C. Foster

It is certified that error appears in the above-identified patent and that said Letters Patent are hereby corrected as shown below:

Col. 11, line 32, "diolefins" should be --diolefines--

Col. 11, line 51, "xe-" at the end of the line should read --ex- --

Col. 14, lines 59 and 60, cancel "in excess of 2, commercially acceptable isoprenes" and insert in lieu thereof --below a value of about 0.65 to 0.7, polyisoprenes--

Col. 15, lines 30 and 31, cancel "polymers of the invention. By isoprene of high yield are:" and insert in lieu thereof --polymer obtained, the speed of reaction, and the yield are:--

Col. 15, line 38, "essentially" should read --essential--

Col. 15, line 39, "isopreene" should read --isoprene--

Col. 15, line 40, insert --about-- after "than"

Col. 16, line 29, insert --highest-- before "purity"

UNITED STATES PATENT OFFICE
CERTIFICATE OF CORRECTION

Patent No. 3,632,563      Dated January 4, 1972

Inventor(s) Lynn B. Wakefield and Frederick C. Foster

It is certified that error appears in the above-identified patent and that said Letters Patent are hereby corrected as shown below:

Col. 16, line 60, "cyclohexone" should read --cyclohexane--

Col. 16, line 69, "dihydrated" should read --dehydrated--

Col. 17, line 9, "catalyt" should read --catalyst--

Col. 17, line 31, "be" should be omitted.

Col. 18, line 68, "shown" should be --show--

Col. 19, line 9, "lihium" should read --lithium--

Col. 21, line 45, "1.0" should read --3.0--

Col. 24, line 39, "trans-4,4-" should read --trans-1,4- --

Col. 25, lines 4 and 5, "12,00", both occurrences, should read --12,000--

Col. 25, line 62, "Gun" should read --Gum--

Col. 25, line 70, "Zinc oxide . . . . 3.0" (second occurrence) should be omitted Col. 25, line 75, "10." should read --1.0--

Col. 26, line 49, "0.2" should read --0.0--

Col. 28, line 6, "petrolactum" should read --petrolatum--

Col. 28, line 61, "petrolactum" should read --petrolatum--

PO-1050
(5/69)

UNITED STATES PATENT OFFICE
CERTIFICATE OF CORRECTION

Patent No. 3,632,563　　　　　　　Dated January 4, 1972

Inventor(s) Lynn B. Wakefield and Frederick C. Foster

It is certified that error appears in the above-identified patent and that said Letters Patent are hereby corrected as shown below:

Col. 29, line 15, "rigth" should read --right--

Col. 29, line 56, "dispenrsion" should read --dispersion--

Col. 29, line 56, "petrolac-" should read --petrola- --

Col. 29, line 71, "ware" should read --were--

Col. 30, line 9, "ditsilled" should read --distilled--

Col. 32, line 50 (in Table II), "90.5" should read --90.5--

Col. 33, line 16, insert after "cis-1,4-;" --2.5% trans-1,4-;--

Col. 33, line 69, "ned" should read --end--

Col. 34, line 71, "2220.00" should read --220.000--

Col. 34, line 71, "200.02" should read --220.00--

Col. 34, line 72, "100.00" should read --100.000--

Signed and sealed this 20th day of June 1972.

(SEAL)
Attest:

EDWARD M. FLETCHER, JR.　　　　　　　ROBERT GOTTSCHALK
Attesting Officer　　　　　　　　　　　Commissioner of Patents